(12) United States Patent
Takagi

(10) Patent No.: US 9,619,635 B2
(45) Date of Patent: Apr. 11, 2017

(54) BIOMETRIC AUTHENTICATION APPARATUS AND METHOD

(71) Applicant: FUJITSU LIMITED, Kawasaki-shi, Kanagawa (JP)

(72) Inventor: Junji Takagi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 26 days.

(21) Appl. No.: 14/594,301

(22) Filed: Jan. 12, 2015

(65) Prior Publication Data

US 2015/0254445 A1 Sep. 10, 2015

(30) Foreign Application Priority Data

Mar. 6, 2014 (JP) .................................. 2014-044182

(51) Int. Cl.
G06F 21/32 (2013.01)
G06F 21/31 (2013.01)
(Continued)

(52) U.S. Cl.
CPC .............. G06F 21/32 (2013.01); G06F 9/505 (2013.01); G06F 9/5083 (2013.01);
(Continued)

(58) Field of Classification Search
CPC ..... G06F 21/32; G06F 21/316; H04L 63/0861
See application file for complete search history.

(56) References Cited

U.S. PATENT DOCUMENTS 5,970,495 A 10/1999 Baru et al.
6,047,281 A * 4/2000 Wilson .............. G06F 17/30327
(Continued)

FOREIGN PATENT DOCUMENTS

EP 1890233 A1 2/2008
EP 2546772 A1 1/2013
(Continued)

OTHER PUBLICATIONS

Ratha, Nalini K., et al. "A real-time matching system for large fingerprint databases." IEEE Transactions on Pattern Analysis and Machine Intelligence 18.8 (1996): 799-813.*
(Continued)

Primary Examiner — Kari Schmidt
(74) Attorney, Agent, or Firm — Fujitsu Patent Center

(57) ABSTRACT

A biometric authentication apparatus includes processing apparatuses allocated with biometric data to be matched, a storage unit that stores a distribution of the biometric data for each of a plurality of quality levels, and an authentication processing time required by an authentication process of each of the processing apparatuses, and a management apparatus. The management apparatus extracts first and second processing apparatuses from the processing apparatuses based on the authentication processing time, identifies a quality level for which a difference between the distributions of the first and second processing apparatuses is greater than or equal to a threshold value, and exchanges the biometric data having the identified quality level between the first and second processing apparatuses.

17 Claims, 15 Drawing Sheets

(51) Int. Cl.
*G06F 9/50* (2006.01)
*H04L 29/06* (2006.01)

(52) U.S. Cl.
CPC .......... *G06F 9/5088* (2013.01); *G06F 21/316* (2013.01); *H04L 63/0861* (2013.01)

(56) References Cited

U.S. PATENT DOCUMENTS

| | | | |
|---|---|---|---|
| 6,070,159 A * | 5/2000 | Wilson | G06K 9/00087 |
| 6,658,473 B1 * | 12/2003 | Block | G06F 9/5033 |
| | | | 709/226 |
| 7,835,548 B1 * | 11/2010 | Langley | G06K 9/00892 |
| | | | 340/5.82 |
| 2006/0104485 A1 * | 5/2006 | Miller, Jr. | G06K 9/00979 |
| | | | 382/115 |
| 2006/0110011 A1 * | 5/2006 | Cohen | G06F 21/121 |
| | | | 382/115 |
| 2006/0156189 A1 | 7/2006 | Tomlin | |
| 2008/0031496 A1 * | 2/2008 | Takagi | G06F 9/505 |
| | | | 382/115 |
| 2009/0100223 A1 | 4/2009 | Murayama et al. | |
| 2010/0191739 A1 | 7/2010 | Wessling et al. | |
| 2010/0318587 A1 | 12/2010 | Seet et al. | |
| 2012/0304267 A1 * | 11/2012 | Yamada | G06K 9/00006 |
| | | | 726/7 |
| 2012/0331479 A1 * | 12/2012 | Takagi | G06F 9/505 |
| | | | 718/105 |
| 2015/0006534 A1 | 1/2015 | Konoshima | |
| 2015/0154260 A1 * | 6/2015 | Partington | G06K 9/00973 |
| | | | 707/769 |

FOREIGN PATENT DOCUMENTS

| | | |
|---|---|---|
| JP | 2008-524750 | 7/2008 |
| JP | 2009-093571 | 4/2009 |
| JP | 2012-516510 | 7/2012 |
| WO | 2006/068993 | 6/2006 |
| WO | 2010/088216 | 8/2010 |
| WO | 2013/136528 A1 | 9/2013 |

OTHER PUBLICATIONS

Vorugunti, Chandra Sekhar, and Sai Sasikanth Varma Indukuri. "A Secure and Efficient BiometricAuthentication as a Service for Cloud Computing." Proceedings of the 6th IBM Collaborative Academia Research Exchange Conference (I-CARE) on I-CARE 2014. ACM, 2014: .(pp. 1-4).*

Extended European Search Report dated Mar. 5, 2015 for corresponding European Patent Application No. 15150620.1, 11 pages.

* cited by examiner

| REGISTERED DATA QUALITY LEVEL | 1 | 2 | 3 | 4 | 5 |
|---|---|---|---|---|---|
| AVERAGE VALUE OF DISTRIBUTION INFORMATION | 10 | 15 | 20 | 100 | 90 |

FIG.6

| REGISTERED DATA QUALITY LEVEL | 1 | 2 | 3 | 4 | 5 |
|---|---|---|---|---|---|
| AVERAGE VALUE OF DISTRIBUTION INFORMATION | 10 | 15 | 20 | 100 | 90 |

FIG.7

| REGISTERED DATA QUALITY LEVEL | 1 | 2 | 3 | 4 | 5 |
|---|---|---|---|---|---|
| AVERAGE VALUE OF DISTRIBUTION INFORMATION | 85 | 90 | 10 | 20 | 30 |

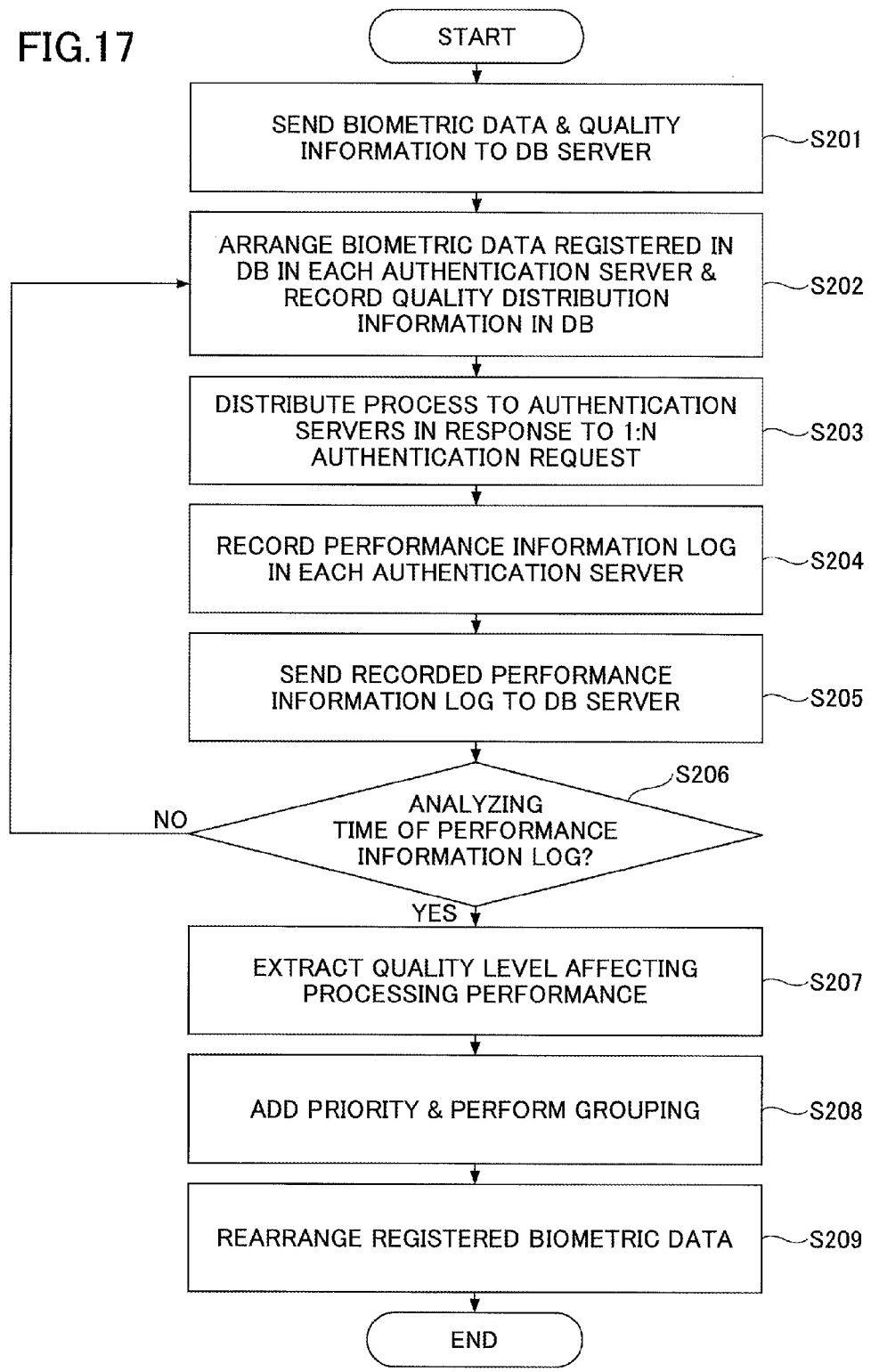

BIOMETRIC AUTHENTICATION APPARATUS AND METHOD

CROSS-REFERENCE TO RELATED APPLICATIONS

This application is based upon and claims the benefit of priority of the prior Japanese Patent Application No. 2014-044182, filed on Mar. 6, 2014, the entire contents of which are incorporated herein by reference.

FIELD

The embodiments discussed herein are related to a biometric authentication apparatus, a biometric authentication method, a program, and a computer-readable storage medium.

BACKGROUND

Biometric authentication performs personal identification (or identify verification) based on biometric information such as fingerprint, iris, retina, vein, or the like, for example. The biometric authentication includes a one-to-one (or 1:1) authentication that performs the personal identification using a user identifier (hereinafter also referred to as a "user ID") and biometric data, and a one-to-many (or 1:N, where N is a natural number greater than or equal to two) authentication that performs the personal identification using only the biometric data and without the use of the user ID. In the 1:N authentication, the biometric data that is input by optically reading the user's fingerprint, for example, is matched (or collated) with a large number of biometric data registered in a database. Hence, although the 1:N authentication requires a longer processing time than the 1:1 authentication, the 1:N authentication does not require the user ID to be input.

In a large-scale biometric authentication apparatus applied with the 1:N authentication and having one million to ten million users, for example, the authentication processing time is long because the large number of registered biometric data. Hence, the processing performance of the biometric authentication apparatus may be improved by performing the 1:N authentication by parallel processing using a plurality of processing apparatuses such as authentication servers. In this case, the database in which the biometric data are registered may be distributively arranged in the plurality of processing apparatuses, that is, distributively stored and managed by the plurality of processing apparatuses.

On the other hand, the registered biometric data include biometric data having various qualities. For this reason, in a case in which low-quality biometric data are biasedly arranged in specific processing apparatuses, there is a possibility that the processing performance of only the specific processing apparatuses will deteriorate. When the processing performance of only the specific processing apparatuses deteriorates, the authentication processing time may greatly differ amongst the plurality of processing apparatuses, making it difficult to take advantage of the parallel processing using the plurality of processing apparatuses, and the processing performance of the biometric authentication apparatus as a whole may deteriorate.

In addition, when the quality of the registered biometric data is too low, the authentication processing time may become short due to the authentication being cancelled by the processing apparatus at an early stage of the authentication, or the authentication processing time may become long abruptly when the quality of the registered biometric data becomes lower than a predetermined quality level. Accordingly, a relationship between the quality of the registered biometric data and the processing time of the authentication performed by the processing apparatus changes depending on a matching algorithm that is used to match the input biometric data with the registered biometric data, and it is difficult to reduce and smoothen the inconsistencies in the processing times of the authentication amongst the plurality of processing apparatuses by simply arranging the low-quality biometric data so as not to be biasedly arranged in the specific processing apparatuses.

Furthermore, a plurality of qualities may be defined with respect to the biometric data, and the relationship between the quality of the biometric data and the authentication processing time is complex. The qualities defined with respect to the biometric data may include an image quality determined according to contents of the biometric data, a registered data quality determined according to contents of the biometric data that is generated from biometric data that are input a plurality of times, for example, when registering the biometric data, or the like. For this reason, the processing performance of the biometric authentication apparatus as a whole cannot be improved by merely evaluating the relationship between the quality of the biometric data and the authentication processing time based on a particular index.

In the large-scale biometric authentication apparatus, amongst the registered biometric data distributively arranged in a plurality of authentication servers, the registered biometric data that actually become matching targets of the 1:N authentication are narrowed down according to the input biometric data, such that different combinations of the registered biometric data are used every time the authentication is performed. For this reason, even when the arrangement of the registered biometric data in one authentication server is modified according to past access frequencies to the registered biometric data, as proposed in Japanese Laid-Open Patent Publication No. 2009-093571, for example, such a modification of the arrangement of the registered biometric data is not effective from the viewpoint of improving the processing performance of the biometric authentication apparatus as a whole.

Accordingly, it is difficult to smoothen the processing times of the authentication amongst the plurality of processing apparatuses when performing the 1:N authentication by the parallel processing.

Examples of prior art methods and systems may be found in Japanese National Publications of International Patent Applications No. 2012-516510 and No. 2008-524750, and Japanese Laid-Open Patent Publication No. 2009-093571, for example.

SUMMARY

Accordingly, it is an object in one aspect of the embodiment to provide a biometric authentication apparatus, a biometric authentication method, a program, and a computer-readable storage medium, which can smoothen the processing times of the authentication amongst the plurality of processing apparatuses when performing the 1:N authentication by the parallel processing.

According to one aspect of the embodiment, a biometric authentication apparatus includes a plurality of processing apparatuses allocated with biometric data to be matched; a storage unit configured to store a distribution of the biometric data for each of a plurality of quality levels, and an authentication processing time required by an authentication process of each of the plurality of processing apparatuses; and a management apparatus configured to extract a first processing apparatus and a second processing apparatus from the plurality of processing apparatuses based on the authentication processing time, identify a quality level for which a difference between the distributions of the first and second processing apparatuses is greater than or equal to a threshold value, and exchange the biometric data having the identified quality level between the first and second processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram for explaining an example of an extraction of quality levels affecting a processing performance of the biometric authentication apparatus;

FIG. 7 is a diagram for explaining an example of an extraction of the quality levels affecting a processing performance of the biometric authentication apparatus;

FIG. 17 is a flow chart for explaining an example of the general operation of the biometric authentication apparatus in the modification.

DESCRIPTION OF EMBODIMENTS

Preferred embodiments of the present invention will be described with reference to the accompanying drawings.

A description will now be given of the biometric authentication apparatus, the biometric authentication method, the program, and the computer-readable storage medium in each embodiment according to the present invention.

In one embodiment, in order to improve a processing performance of the entire biometric authentication apparatus, a relation between an authentication processing time and quality information of biometric data is used to determine a method of arranging registered data, and an inconsistency in the authentication processing times is reduced amongst a plurality of processing apparatuses that perform a 1:N authentication by parallel processing.

More particularly, amongst a plurality of authentication processing apparatuses, which are examples of the plurality of processing apparatuses and store the biometric data, the authentication processing apparatuses having short processing times and the authentication processing apparatuses having long processing times are extracted, and the biometric data stored in each of the authentication processing apparatuses are classified by quality. By interchanging the biometric data having differences in distributions of the qualities amongst the authentication processing apparatuses having the short processing times and the authentication processing apparatuses having the long processing times, the processing times can be levelled (or smoothened) amongst the plurality of authentication processing apparatuses.

Figure 1:
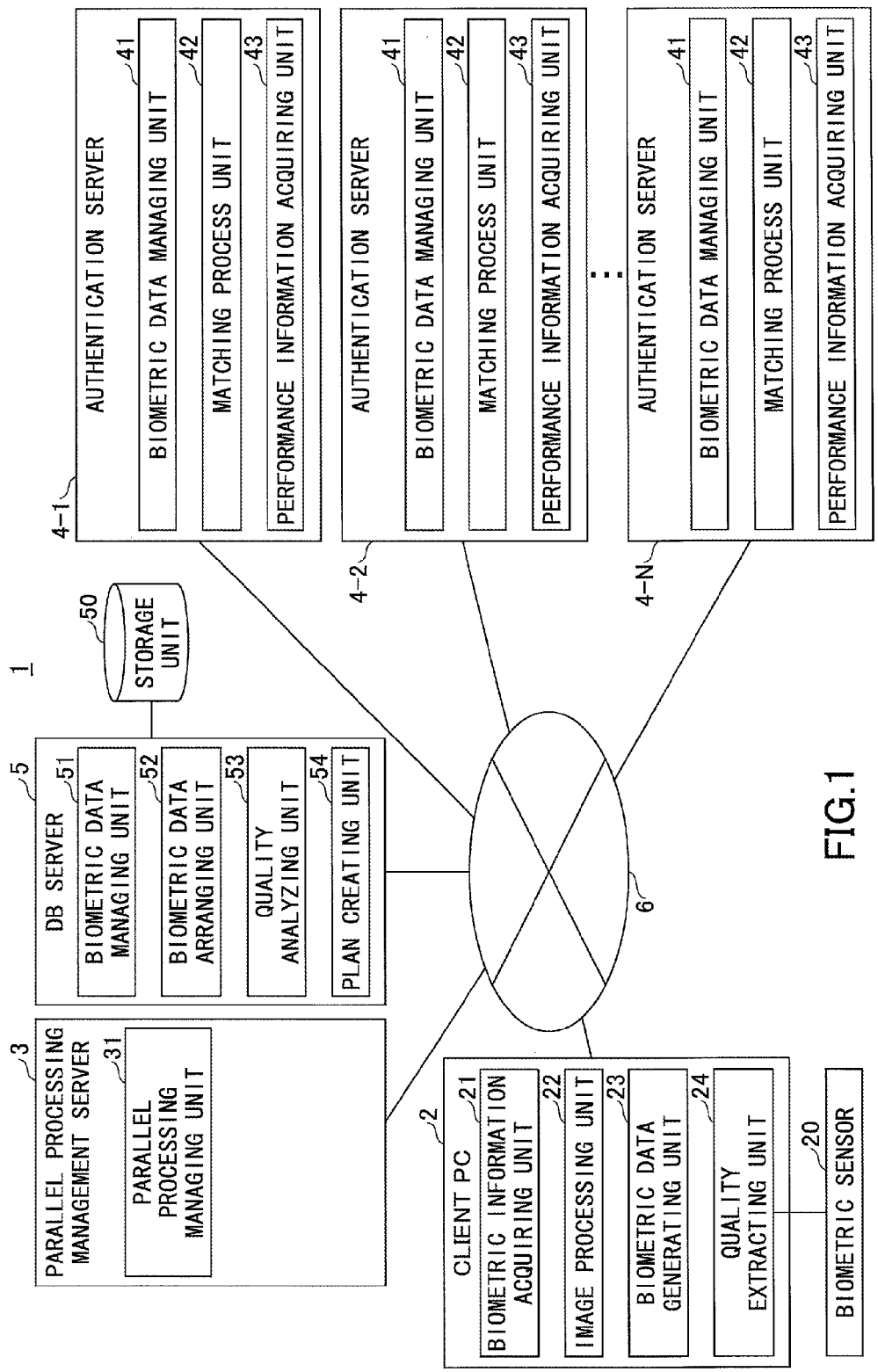
FIG. 1 is a block diagram illustrating an example of a configuration of a biometric authentication apparatus in one embodiment.

FIG. 1 is a block diagram illustrating an example of a configuration of the biometric authentication apparatus in one embodiment. A biometric authentication apparatus 1 illustrated in FIG. 1 includes a client PC (Personal Computer) 2, a parallel processing management server 3, authentication servers 4-1 through 4-N (N is a natural number greater than or equal to two), and a DB (Data-Base) server (or management server) 5 that are connected via a network 6. The authentication servers 4-1 through 4-N are examples of authentication processing apparatuses. The DB server 5 is an example of a management apparatus.

The client PC 2 is an example of a computer usable by a user who is an example of a client. In this example, the client PC 2 is connected to a biometric sensor 20. The biometric sensor 20 detects biometric information of the user, such as fingerprint, iris, retina, vein, or the like, for example. The biometric sensor 20 may have a known configuration. The client PC 2 includes a biometric information acquiring unit 21, an image processing unit 22, a biometric data generating unit 23, and a quality extracting unit 24. The biometric sensor 20 may be included in the client PC 2.

The parallel processing management server 3 is an example of a computer that distributes a 1:N matching process (or collating process) to the plurality of authentication servers 4-1 through 4-N, and returns to the client PC 2 an authentication result by integrating results of parallel processing of the 1:N matching performed by the plurality of authentication servers 4-1 through 4-N. The parallel processing management server 3 includes a parallel processing managing unit 31.

The plurality of authentication servers 4-1 through 4-N are examples of computers that perform the 1:N authentication by the parallel processing. The processing time when each of the authentication servers 4-1 through 4-N perform the 1:N authentication, and quality information of the biometric data (hereinafter also referred to as "registered biometric data") that are registered and matched (or collated) with the biometric data sent from the client PC 2, are recorded in a performance information log and sent to the DB server 5 periodically, for example. Each of the authentication servers 4-1 through 4-N includes a biometric data managing unit 41, a matching process unit (or collating process unit) 42, and a performance information acquiring unit 43.

The DB server 5 is an example of a computer that manages a DB for storing the registered data including the biometric data, the quality information, or the like. This DB is stored in a storage unit 50 that is accessible from the DB server 5. The DB server 5 has functions to analyze the performance information log sent from each of the authentication servers 4-1 through 4-N, and to extract the quality information (or quality level) that affects the processing performance of the biometric authentication apparatus 1. In addition, the DB server 5 also has a function to allocate (hereinafter also referred to as "arrange") the biometric data that are registered in the DB and are the matching targets (or collating targets) to each of the authentication servers 4-1 through 4-N. The DB server 5 includes a biometric data managing unit 51, a biometric data arranging unit 52, a quality analyzing unit 53 to analyze the quality of the biometric data, and a plan creating unit 54 to create a plan to rearrange the biometric data.

Figure 2:
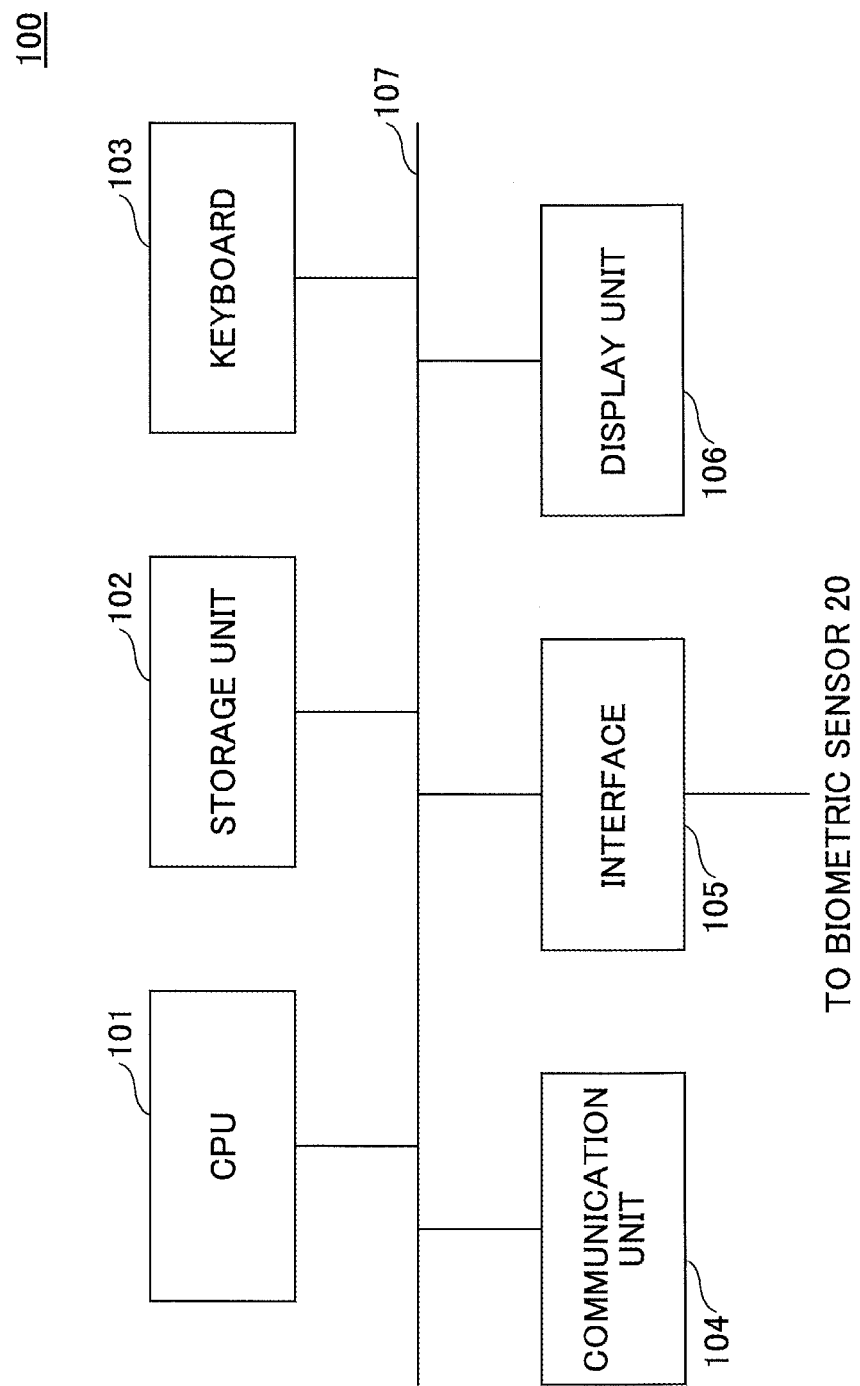
FIG. 2 is a block diagram illustrating an example of a configuration of a computer.

FIG. 2 is a block diagram illustrating an example of a configuration of the computer. Each of the client PC 2, the parallel processing management server 3, the authentication servers 4-1 through 4-N, and the DB server 5 may be formed by a computer 100 illustrated in FIG. 2. The computer 100 includes a CPU (Central Processing Unit) 101 which is an example of a processor, a storage unit 102, a keyboard 103 which is an example of an input device, a communication unit 104, an interface 105, or the like. In a case in which the computer 100 forms the client PC 2, for example, the computer 100 may further include a display unit 106 which is an example of an output device. In this example, the CPU 101, the storage unit 102, the keyboard 103, the communication unit 104, the interface 105, and the display unit 106 are connected via a bus 107. However, the configuration of the computer 100 is not limited to the configuration in which the constituent elements of the computer 100 are connected via the bus 107. The biometric sensor 20 illustrated in FIG. 1 may be connected to the interface 105, for example.

The storage unit 102 stores one or more programs to be executed by the CPU 101, various kinds of data, or the like. The storage unit 102 may be formed by a storage device such as a memory, a HDD (Hard Disk Drive), or the like. The storage unit 102 may form an example of a non-transitory computer-readable storage medium that stores one or more programs which, when executed by the computer 100 (or CPU 101), causes the computer 100 to perform the functions of any one of the client PC 2, the parallel processing management server 3, the authentication servers 4-1 through 4-N, and the DB server 5.

The CPU 101 controls the entire computer 100 by executing one or more programs stored in the storage unit 102. In the case in which the computer 100 forms the client PC 2, the CPU 101 performs functions of the biometric information acquiring unit 21, the image processing unit 22, the biometric data generating unit 23, and the quality extracting unit 24, by executing one or more programs. In a case in which the computer 100 forms the parallel processing management server 3, the CPU 101 performs functions of the parallel processing managing unit 31 by executing one or more programs. In a case in which the computer 100 forms the authentication server 4-1, for example, the CPU 101 performs functions of the biometric data managing unit 41, the matching process unit 42, and the performance information acquiring unit 43 by executing one or more programs. In a case in which the computer 100 forms the DB server 5, the CPU 101 performs functions of the biometric data managing unit 51, the biometric data arranging unit 52, the quality analyzing unit 53, and the plan creating unit 54 by executing one or more programs. In addition, in the case in which the computer 100 forms the DB server 5, the storage unit 102 may function as the storage unit 50.

The keyboard 103 may be used to input commands and data to the CPU 101. The communication unit 104 performs a cable or wireless communication between the computer 100 and an external apparatus such as another computer. The interface 105 may be used to connect the computer 100 to the external apparatus. The display unit 106 may display various data, messages, or the like to the user (or operator) of the computer 100, under the control of the CPU 101.

Figure 3:
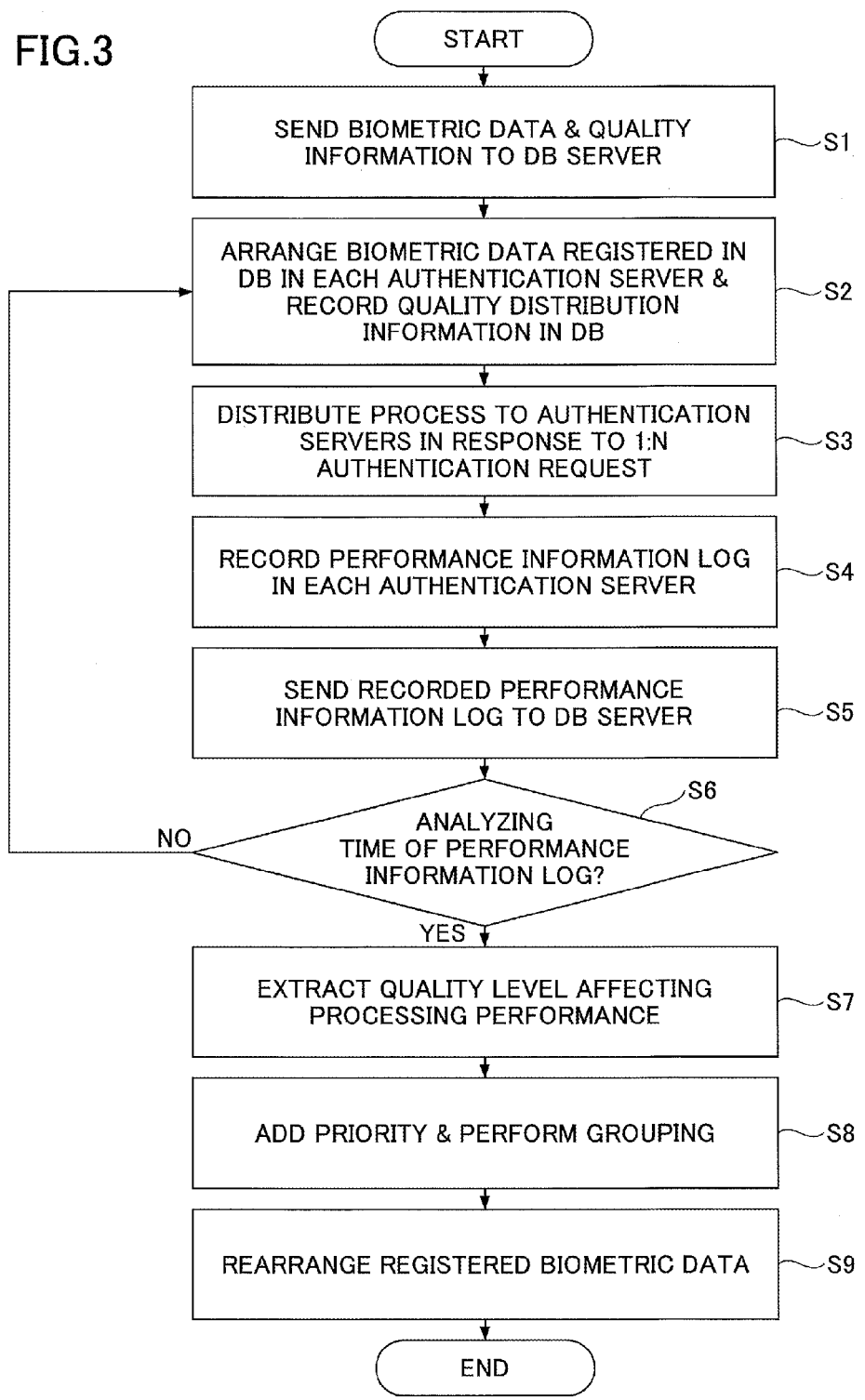
FIG. 3 is a flow chart for explaining an example of a general operation of the biometric authentication apparatus in one embodiment.

Next, a description will be given of a general operation of the biometric authentication apparatus 1, by referring to FIG. 3. FIG. 3 is a flow chart for explaining an example of the general operation of the biometric authentication apparatus in one embodiment.

In FIG. 3, the client PC 2 executes step S1 at the time of registering the biometric data. More particularly, in the client PC 2, the biometric information acquiring unit 21 acquires the biometric information (for example, biometric image data) of the user detected by the biometric sensor 20, and the image processing unit 22 performs an image processing, such as noise reduction, binarization, thinning, or the like, with respect to the acquired biometric information. In addition, the biometric data generating unit 23 generates biometric data to be registered in the DB of the DB server 5, based on the biometric information that is subjected to the image processing in the image processing unit 22. Further, the quality extracting unit 24 extracts quality information (for example, a quality level) indicating the quality of the biometric data, from the biometric information of the user detected by the biometric sensor 20 and the biometric data generated by the biometric data generating unit 23.

In a case in which the biometric information is fingerprint information and the biometric sensor 20 is a fingerprint sensor, for example, the quality extracting unit 24 extracts the quality information of fingerprint data, when the image processing unit 22 performs the image processing with respect to fingerprint image data output from the fingerprint sensor and the biometric data generating unit 23 generates the biometric data to be registered based on the fingerprint data that is subjected to the image processing.

Accordingly, the client PC 2, in step S1, sends the biometric data to be registered, generated by the biometric data generating unit 23, and the quality information of the biometric data extracted by the quality extracting unit 24, to the DB server 5 via the network 6, and registers the biometric data and the quality information in the DB within the storage unit 50 of the DB server 5. The biometric data and the quality information are registered in the DB by the biometric data managing unit 51 of the DB server 5.

Figures 4, 5:
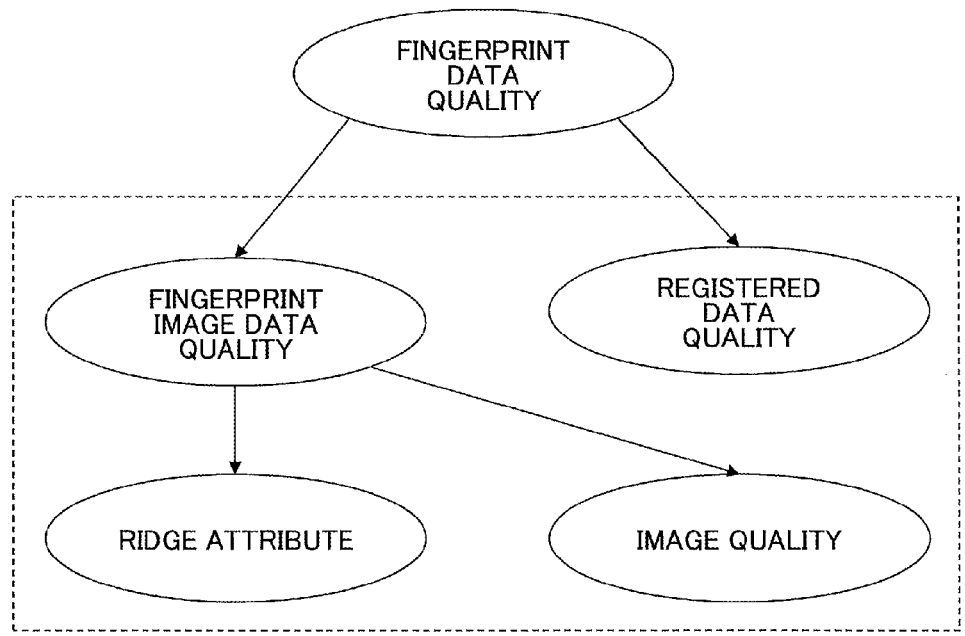
FIG. 4 is a diagram for explaining qualities of fingerprint data, which is an example of biometric data.
FIG. 5 is a diagram for explaining an example of quality distribution information of the biometric data.

FIG. 4 is a diagram for explaining qualities of the fingerprint data, which is an example of biometric data. In the example illustrated in FIG. 4, the quality of the fingerprint data is categorized into four quality types surrounded by a dotted line. The four quality types include a fingerprint image data quality, an image quality (hereinafter also referred to as a "ridge attribute quality") evaluated using an attribute (for example, a continuity in a ridge direction) of ridges (or friction ridges) of the fingerprint, a quality evaluated using a general image quality (for example, contrast, resolution, or the like), and registered data quality. In this example, the quality evaluated using the general image quality is a quality that is evaluated by digitizing the contrast of the image data.

Methods of computing the quality level of each of the quality types are not limited to particular methods. The quality level that uses the attribute of the ridges of the fingerprint may be evaluated, for example, by segmenting the fingerprint image data into 9×9 equal blocks, and evaluating the quality level in five stages using a ratio of the blocks clearly (or sharply) representing the ridges amongst the total number of blocks. The quality level that is evaluated by digitizing the contrast of the image data may be evaluated, for example, by segmenting the fingerprint image data into 9×9 equal blocks, representing the pixel value of each block in 256 gradation levels from 0 to 255 in Gray scale, and evaluating a computed value of $C=(P_{max}-P_{min})/(P_{max}+P_{min})$, where $P_{max}$ denotes a maximum pixel value within the image data and $P_{min}$ denotes a minimum pixel value within the image data. The fingerprint image data quality may be determined, for example, by integrating the quality level represented using the attribute value of the ridges of the fingerprint and the quality level represented using the contrast of the image data.

The registered data quality is the quality of the fingerprint data that is registered. The registered data quality may be determined, for example, by using similarities of a plurality of fingerprints input at the time of registering the fingerprint. When registering the fingerprint data, the fingerprint image data that are input from the fingerprint sensor a plurality of times are acquired, for example, and the fingerprint data to be registered is generated from the acquired fingerprint image data. In a case in which the states of the user's fingerprints are good, there is a high possibility that the plurality of fingerprint image data that are acquired will match. The registered data quality may be determined, for example, according to a degree of matching of the plurality of fingerprint image data that are input when generating the fingerprint data to be registered.

Returning now to the description of FIG. 3, the DB server 5 executes step S2 at the time of starting or restarting the biometric authentication apparatus 1. More particularly, in the DB server 5, the biometric data arranging unit 52 arranges the biometric data registered in the DB in each of the authentication servers 4-1 through 4-N. The biometric data arranged in each of the authentication servers 4-1 through 4-N are stored in the biometric data managing unit 41 or in a storage unit (not illustrated) that is managed by the biometric data managing unit 41. In addition, the quality analyzing unit 53 records, in the DB, quality distribution information including a number of biometric data, identifiers (IDs) of the biometric data, the quality level of the corresponding biometric data, or the like for each quality level of the biometric data arranged in each of the authentication servers 4-1 through 4-N. The biometric data arranging unit 52 may, at the time of starting or restarting the biometric authentication apparatus 1, arrange the biometric data registered in the DB in each of the authentication servers 4-1 through 4-N, based on an analysis result of the quality of the biometric data analyzed by the quality analyzing unit 53.

FIG. 5 is a diagram for explaining an example of the quality distribution information of the biometric data. In FIG. 5, amongst registered data quality levels 1, 2, . . . , and 5, the larger the value of the registered data quality, the higher the quality of the biometric data. FIG. 5 illustrates the quality distribution information arranged in one authentication server 4-$i$ (i=1, . . . , N) amongst the plurality of authentication servers 4-1 through 4-N, including 10 biometric data having the quality level 1, 15 biometric data having the quality level 2, . . . , and 90 biometric data having the quality level 5. As will be described later, in a case in which a plurality of quality types (or indexes) exist, the quality distribution information for each quality type may be stored in the DB of the DB server 5. In other words, the quality distribution information of each quality level of the quality evaluated in a manner similar to the registered data quality, using the quality of the fingerprint image data, the quality evaluated using the attribute of the ridges of the fingerprint, and the image quality (for example, contrast, resolution, or the like), may be arranged in each of the authentication servers 4-1 through 4-N.

The parallel processing management server 3 executes step S3 when the parallel processing management server 3 receives a 1:N authentication request from the client PC 2. More particularly, in the parallel processing management server 3, the parallel processing managing unit 31 distributes the processes to the plurality of authentication servers 4-1 through 4-N in response to the 1:N authentication request.

Each of the authentication servers 4-1 through 4-N executes step S4. More particularly, in each of the authentication servers 4-1 through 4-N, the matching process unit 42 records a processing time for the case in which the 1:N authentication is performed, and the quality information of the registered biometric data managed by the biometric data managing unit 41, matched with the biometric data sent from the client PC 2 and acquired by the performance information acquiring unit 43, in the performance information log within the biometric data managing unit 41. The performance information log is stored in the performance information acquiring unit 43 or in the storage unit managed by the performance information acquiring unit 43.

The performance information log recorded by the performance information acquiring unit 43 may include the following information, for example. In the following information, a quality $q_{11}$ of biometric data d1 of a quality type k1, and a quality $q_{21}$ of biometric data d1 of a quality type k2, are examples of quality levels of different quality types.

"ID of 1:N authentication request, processing time, number of biometric data, the quality type k1 (for example, information indicating the registered data quality), the quality $q_{11}$ of the biometric data d1, a quality $q_{12}$ of biometric data d2, . . . , a quality $q_{1N}$ of biometric data dN, the quality type k2 (for example, information indicating quality of biometric image data), a quality $q_{21}$ of the biometric data d1, a quality q22 of the biometric data d2, . . . , a quality $q_{2N}$ of the biometric data dN, a quality type k3, . . . "

Each of the authentication servers 4-1 through 4-N executes step S5. More particularly, in each of the authentication servers 4-1 through 4-N, the performance information acquiring unit 43 sends the recorded performance information log to the DB server 5 periodically, for example. Step S5 may be executed by the parallel processing management server 3. In this case, the parallel processing management server 3 may periodically aggregate and send to the DB server 5 the performance information logs from each of the authentication servers 4-1 through 4-N.

The DB server 5 executes step S6. More particularly, in the DB server 5, the quality analyzing unit 53 judges whether the time is the analyzing time of the performance information log sent from each of the authentication servers 4-1 through 4-N (or the parallel processing management server 3) and stored in the DB, and the process returns to step S2 when the judgment result in step S6 is NO. On the other hand, the process advances to step S7 when the judgment result in step S6 is YES.

The DB server 5 executes step S7. More particularly, in the DB server 5, the quality analyzing unit 53 makes a reference to the performance information log sent from each of the authentication servers 4-1 through 4-N, and extracts and stores in the DB the quality levels that affect the processing performance of the biometric authentication apparatus 1, amongst the authentication servers having the processing time with a small average value (that is, a high processing speed) and the authentication servers having the processing time with a large average value (that is, a low processing speed).

FIGS. 6 and 7 are diagrams for explaining examples of an extraction of the quality levels affecting the processing performance of the biometric authentication apparatus. FIG. 6 illustrates a part of the performance information log of the authentication server 4-1, and FIG. 7 illustrates a part of the performance information log of the authentication server 4-2. In FIGS. 6 and 7, amongst the registered data quality levels 1, 2, . . . , and 5, the larger the value of the registered data quality, the higher the quality of the biometric data. FIG. 6 illustrates a case in which the average value of the processing time of the authentication server 4-1 is small (for example, 100 milliseconds or less), and FIG. 7 illustrates a case in which the average value of the processing time of the authentication server 4-2 is large (for example, 1 second or greater). The quality analyzing unit 53 of the DB server 5 computes a difference between the number of biometric data for each registered data quality level of the registered biometric data between the authentication servers 4-1 and 4-2, and judges that the quality level affects the processing performance of the biometric authentication apparatus 1 when the difference is greater than a threshold value (50 in this example). Accordingly, in this example, as surrounded by rectangles indicated by bold solid lines in FIGS. 6 and 7, the quality levels 4 and 5 having large values in FIG. 6 are judged as the quality levels affecting the processing performance of the biometric authentication apparatus 1 for the authentication server 4-1, and the quality levels 1 and 2 having small values in FIG. 7 are judged as the quality levels affecting the processing performance of the biometric authentication apparatus 1 for the authentication server 4-2.

The DB server 5 executes step S8 when the quality levels of different quality types exist. More particularly, in the DB server 5, the quality analyzing unit 53 adds a priority to the quality levels that affect the processing performance of the biometric authentication apparatus 1 approximately to the same extent, amongst the quality levels of the different quality types within the performance information log stored in the DB, based on the quality levels judged as affecting the processing performance, and groups the quality levels added with the same priority into the same group. The priority represents a priority order with which the registered biometric data are to be exchanged amongst the plurality of authentication servers 4-1 through 4-N, and the higher the priority the more the processing performance of the biometric authentication apparatus 1 is affected. The difference in the number of biometric data computed for the quality levels 4 and 5 in FIG. 6 is smaller than the difference in the number of biometric data computed for the quality levels 1 and 2 in FIG. 7. Hence, the extent to which the processing performance of the biometric authentication apparatus 1 is affected by the quality levels 4 and 5 in FIG. 6 is smaller than the extent to which the processing performance is affected by the quality levels 1 and 2 in FIG. 7, and the priorities of the quality levels 4 and 5 in FIG. 6 are set lower than the priorities of the quality levels 1 and 2 in FIG. 7. The priority that is added when performing the grouping, may be added, for example, to the quality levels of the registered data quality, and the quality of the biometric image data (for example, defined by the attribute of the ridges included in the fingerprint image data and the general image quality).

The DB server 5 executes step S9. More particularly, in the DB server 5, the plan creating unit 54 rearranges the biometric data registered in the DB in each of the authentication servers 4-1 through 4-N, based on the analysis result of the quality of the biometric data analyzed by the quality analyzing unit 53, including the grouping, and the process ends. In other words, the plan creating unit 54 rearranges the registered biometric data arranged in the plurality of authentication servers 4-1 through 4-N, depending on the grouped quality levels, so that the number of biometric data having the quality levels affecting the processing performance of the biometric authentication apparatus 1 becomes uniform amongst the plurality of authentication servers 4-1 through 4-N. The rearrangement of the registered biometric data is performed by exchanging the registered biometric data amongst the authentication servers 4-1 through 4-N according to the priority order of the priorities added to the quality levels, so that the number of biometric data having the quality levels affecting the processing performance of the biometric authentication apparatus 1 becomes uniform amongst the plurality of authentication servers 4-1 through 4-N. By performing the data exchange with priority starting from the registered biometric data having the quality levels that greatly affect the processing time, the effect of reducing the inconsistency amongst the processing times of the authentication servers 4-1 through 4-N can be improved.

In the case of the examples illustrated in FIGS. 6 and 7, the registered biometric data having the large quality levels surrounded by the rectangle indicated by the bold solid line in FIG. 6 and the registered biometric data having the small quality levels surrounded by the rectangle indicated by the bold solid line in FIG. 7 are exchanged between the authentication servers 4-1 and 4-2 according to the priority order of the priorities added to the quality levels, so that the number of biometric data having the quality levels affecting the processing performance of the biometric authentication apparatus 1 becomes uniform between the authentication servers 4-1 and 4-2. Hence, amongst the plurality of authentication servers 4-1 through 4-N, the registered biometric data are exchanged between the authentication server which causes the long processing time of the biometric authentication apparatus 1 on an average and the authentication server which causes the short processing time of the biometric authentication apparatus 1 on an average, so that the number of biometric data having the quality levels affecting the processing performance of the biometric authentication apparatus 1 becomes uniform, to thereby perform the rearrangement of the registered biometric data.

Figure 8:
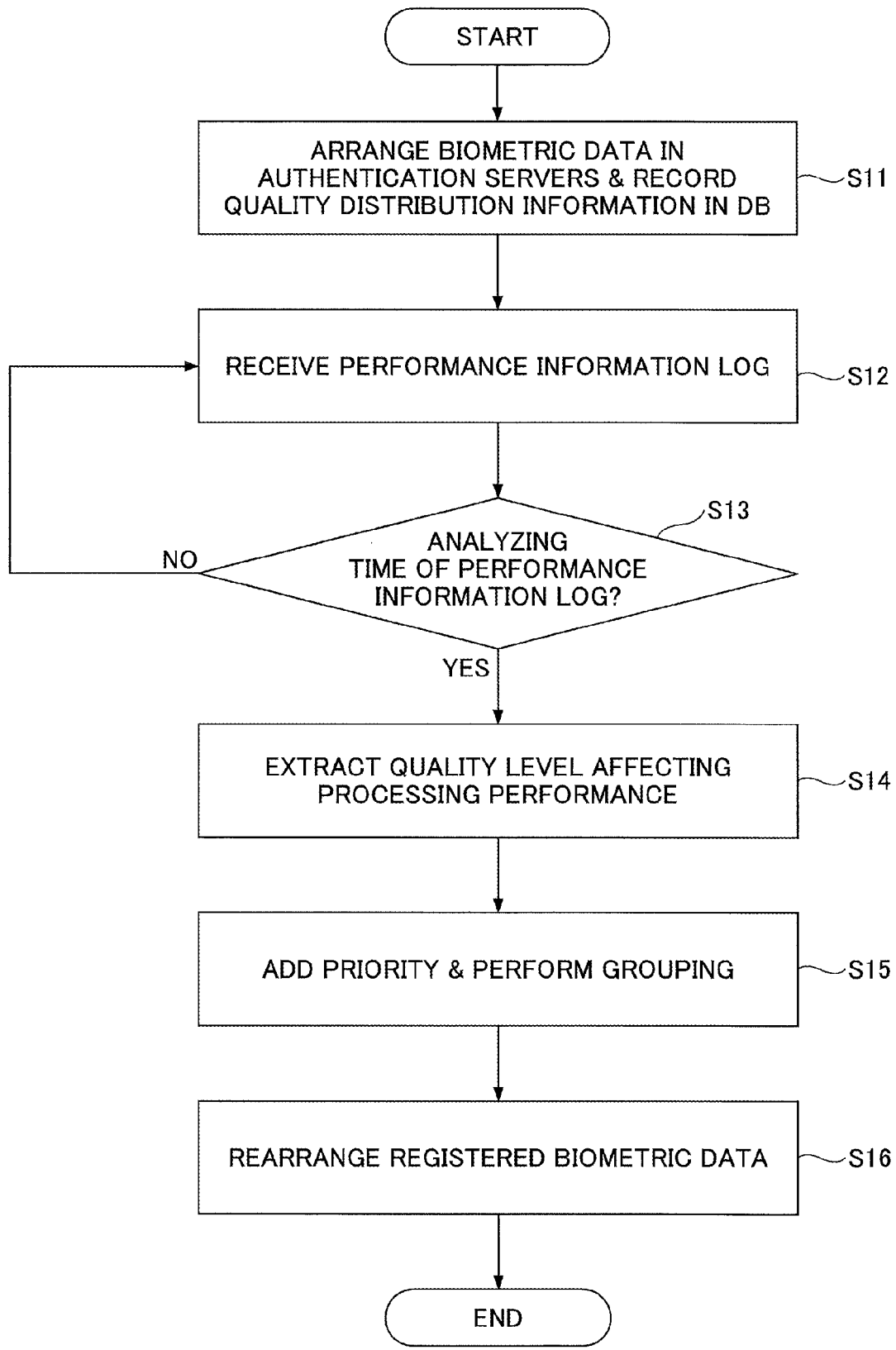
FIG. 8 is a flow chart for explaining, in more detail, an example of a process of a database server.

FIG. 8 is a flow chart for explaining, in more detail, an example of a process of the database server. In step S11 illustrated in FIG. 8, at the time of starting or restarting the biometric authentication apparatus 1, the biometric data arranging unit 52 of the DB server 5 arranges the biometric data registered in the DB that is managed by the biometric data managing unit 51 in each of the authentication servers 4-1 through 4-N, and the quality analyzing unit 53 records in the DB within the storage unit 50 the quality distribution information including the number of biometric data, the identifiers (IDs) of the biometric data, the quality level of the corresponding biometric data, or the like for each quality level of the biometric data arranged in each of the authentication servers 4-1 through 4-N. In the case in which a plurality of quality types exist, the quality distribution information for each quality type may be recorded in the DB within the storage unit 50.

In step S12, the quality analyzing unit 53 of the DB server 5 receives the performance information log periodically, for example, from each of the authentication servers 4-1 through 4-N. This performance information log includes the processing time of each of the authentication servers 4-1 through 4-N which receives the 1:N authentication request from the client PC 2 via the parallel processing management server 3, when each of the authentication servers 4-1 through 4-N executes the 1:N authentication, and the quality information of the registered biometric data.

In step S13, the quality analyzing unit 53 of the DB server 5 judges whether the time is the analyzing time of the performance information log, and the process returns to step S12 when the judgment result in step S13 is NO. On the other hand, the process advances to step S14 when the judgment result in step S13 is YES.

In step S14, the quality analyzing unit 53 of the DB server 5 makes a reference to the performance information log, and extracts the quality levels that affect the processing performance of the biometric authentication apparatus 1, between the authentication servers having the processing time with the small average value (that is, a high processing speed) and the authentication servers having the processing time with the large average value (that is, a low processing speed).

In step S15, the quality analyzing unit 53 of the DB server 5 performs a grouping by adding the priority according to the extent to which the processing performance of the biometric authentication apparatus 1 is affected, to the quality levels affecting the processing performance approximately to the same extent, amongst the quality levels of different quality types within the performance information log stored in the DB, based on the quality levels that are judged as affecting the processing performance.

In step S16, the plan creating unit 54 of the DB server 5 rearranges the registered biometric data arranged in the plurality of authentication servers 4-1 through 4-N, according to the quality levels grouped by the grouping, so that the number of biometric data having the quality levels affecting the processing performance of the biometric authentication apparatus 1 becomes uniform amongst the plurality of authentication servers 4-1 through 4-N. The process ends after step S16. The registered biometric data are rearranged by exchanging the registered biometric data amongst the plurality of authentication servers 4-1 through 4-N according to the priority order of the priorities added to the quality levels, so that the number of biometric data having the quality levels affecting the processing performance of the biometric authentication apparatus 1 becomes uniform amongst the plurality of authentication servers 4-1 through 4-N. By exchanging the registered biometric data having the quality levels greatly affecting the processing time with priority over the registered biometric data having the quality levels less affecting the processing time, it is possible to improve the effect of reducing the inconsistency in the processing times amongst the authentication servers 4-1 through 4-N.

Figure 9:
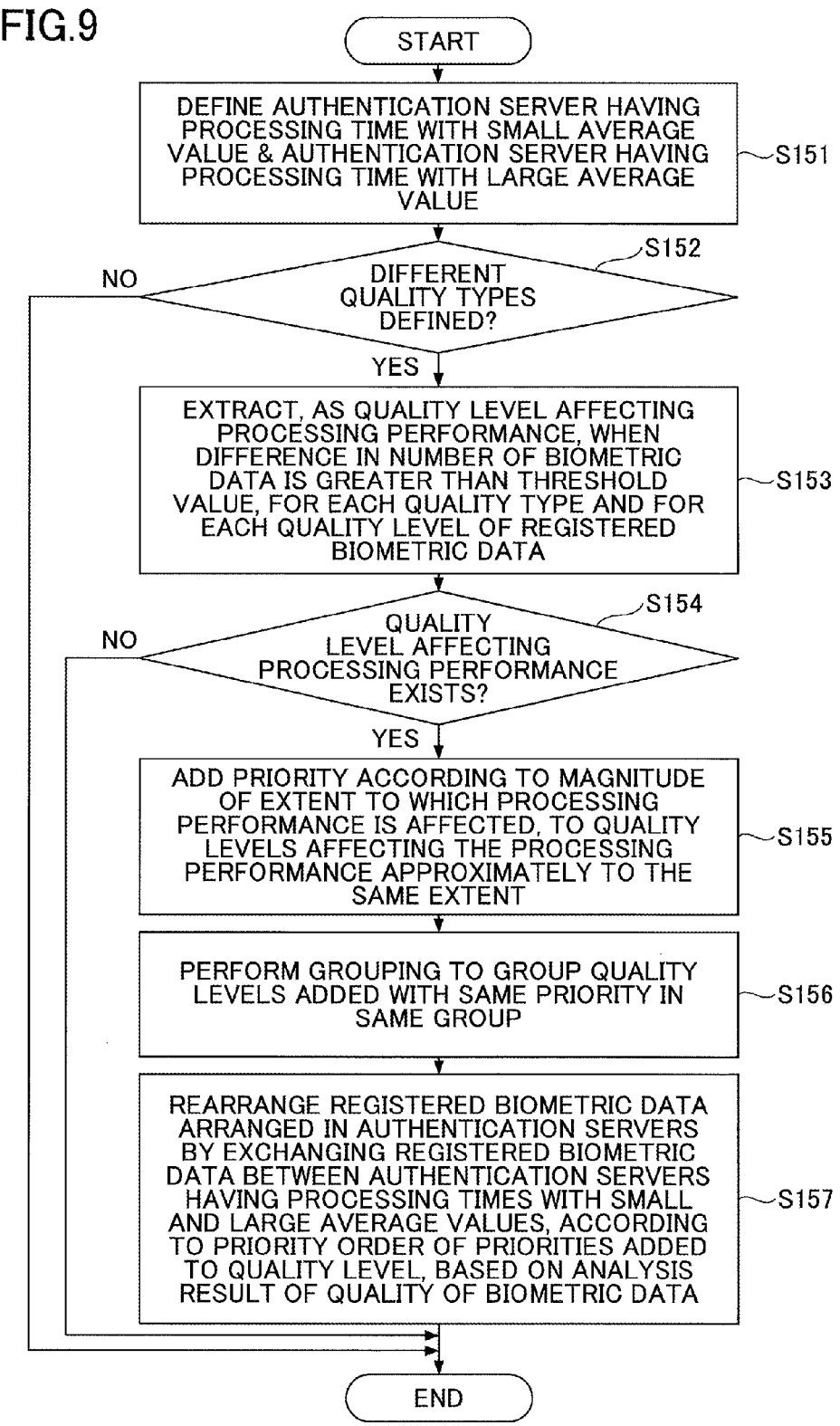
FIG. 9 is a flow chart for explaining an example of grouping.

FIG. 9 is a flow chart for explaining an example of the grouping. FIG. 9 illustrates the process of step S15 illustrated in FIG. 8 in more detail. In step S151 illustrated in FIG. 9, the quality analyzing unit 53 of the DB server 5 defines, as an authentication server having the processing time with a small average value, the authentication server having the processing time with an average value less than or equal to a first threshold value (for example, 100 milliseconds), and defines, as an authentication server having the processing time with a large average value, the authentication server having the processing time with an average value greater than or equal to a second threshold value (for example, 1 second).

In step S152, the quality analyzing unit 53 judges whether a plurality of different quality types are defined, and the process ends when the judgment result in step S152 is NO. On the other hand, the process advances to step S153 when the judgment result in step S152 is YES.

In step S153, the quality analyzing unit 53 makes a reference to the performance information log of the authentication server (hereinafter also referred to as "authentication server having a high processing speed") having the processing time with the small average value and the authentication server (hereinafter also referred to as "authentication server having a low processing speed") having the processing time with the large average value, and extracts, as a quality level affecting the processing performance of the biometric authentication apparatus 1, when the difference in the number of biometric data having this quality level in the authentication server having the high processing speed and the authentication server having the low processing speed is greater than a threshold value (for example, 50), for each of the quality types and also for each of the quality levels of the registered biometric data.

In step S154, the quality analyzing unit 53 judges whether the quality level affecting the processing performance of the biometric authentication apparatus 1 exists, and the process ends when the judgment result in step S154 is NO. On the other hand, the process advances to step S155 when the judgment result in step S154 is YES.

In step S155, the quality analyzing unit 53 adds a priority that is higher for a quality level that is judged as affecting the processing performance of the biometric authentication apparatus 1 and the difference in the number of biometric data having this quality level is more greater than the threshold value, for each of the quality types. Hence, amongst the quality levels of the different quality types within the performance information log stored in the DB, the quality levels affecting the processing performance of the biometric authentication apparatus 1 approximately to the same extent are added with the priorities according to the magnitude of the extent to which the processing performance is affected. A method of determining the priority is not limited to a particular method. For example, with respect to each of the quality levels of the registered biometric data, a priority p1 may be added to the quality level for which the difference in the number of biometric data between the authentication server having the processing time with the small average value and the authentication server having the processing time with the large average value amongst the plurality of authentication servers 4-1 through 4-N is greater than or equal to 100, a priority p2 may be added to the quality level for which the difference in the number of biometric data is greater than or equal to 50 and less than 100, and a priority p3 may be added to the quality level for which the difference in the number of biometric data is less than 50, where p1>p2>p3.

In step S156, the quality analyzing unit 53 performs a grouping to group the quality levels added with the same priority, amongst the quality levels of the different quality types within the performance information log stored in the DB, in the same group.

Figure 10:
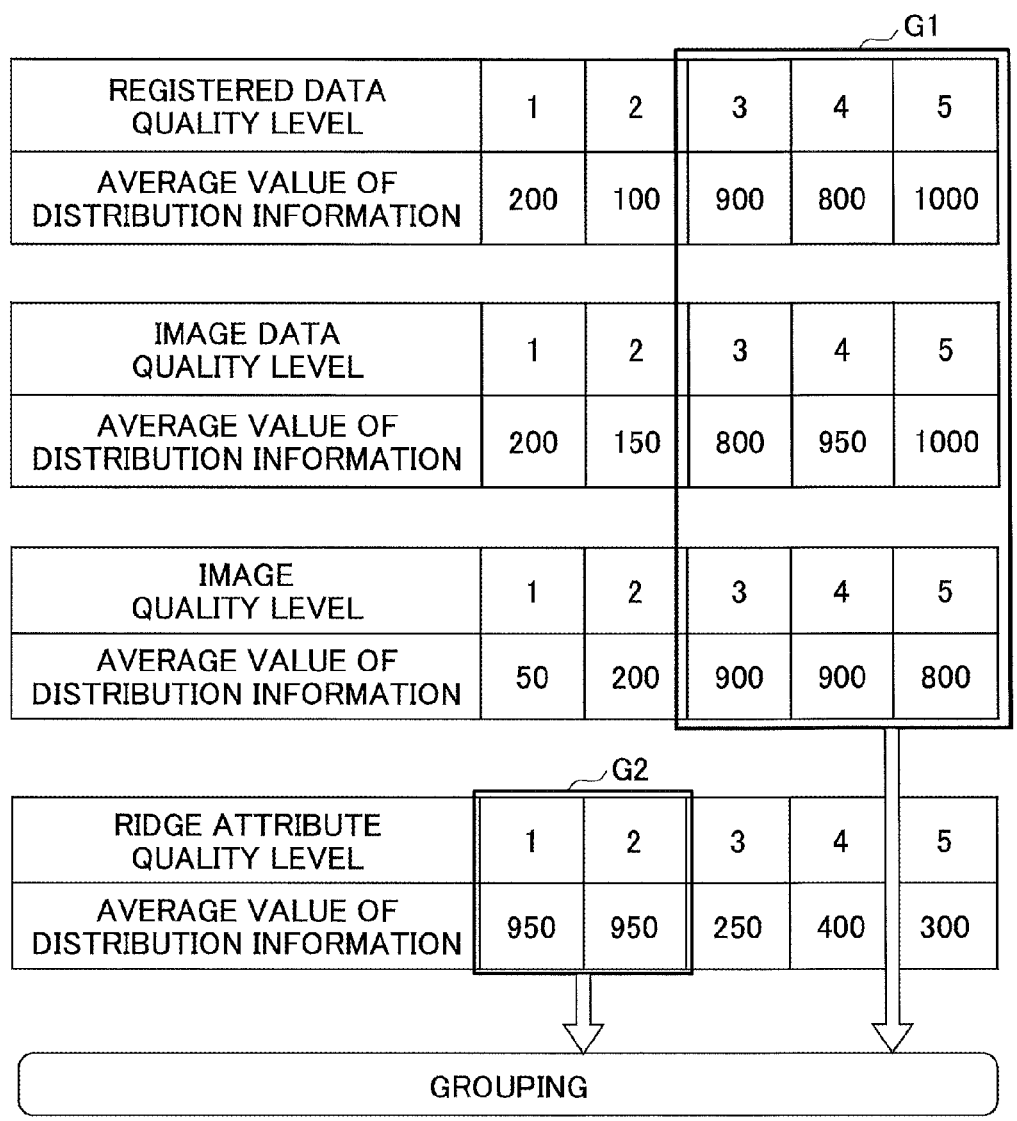
FIG. 10 is a diagram for explaining an example of the grouping of quality levels according to different quality types.

FIG. 10 is a diagram for explaining an example of the grouping of the quality levels according to the different quality types. FIG. 10 illustrates a part of the performance information log of the authentication server 4-*i*, for an example in which four quality types are recorded. The four quality types include a registered data quality, an image data quality, an image quality, and a ridge attribute quality. In this example of the grouping, the grouping is performed according to a continuity of the quality levels affecting the processing performance of the biometric authentication apparatus 1. In this example, with respect to the registered data quality, the image data quality, and the image quality, the number of biometric data is continuously large for the three quality levels 3, 4, and 5, and these quality levels 3, 4, and 5 affect the processing performance of the biometric authentication apparatus 1 to a large extent. For this reason, the quality levels 3, 4, and 5 are grouped into a single group G1 by the grouping. In addition, with respect to the ridge attribute quality, the number of biometric data is continuously large for the two quality levels 1 and 2, and these quality levels 1 and 2 affect the processing performance of the biometric authentication apparatus 1 to a large extent. Hence, the quality levels 1 and 2 are grouped into a single group G2 by the grouping. Furthermore, since the average number of biometric data with respect to one quality level of the group G2 is larger than the average number of biometric data with respect to one quality level of the group G1, the priority set for the group G2 in this example is higher than that set for the group G1.

Figure 11:
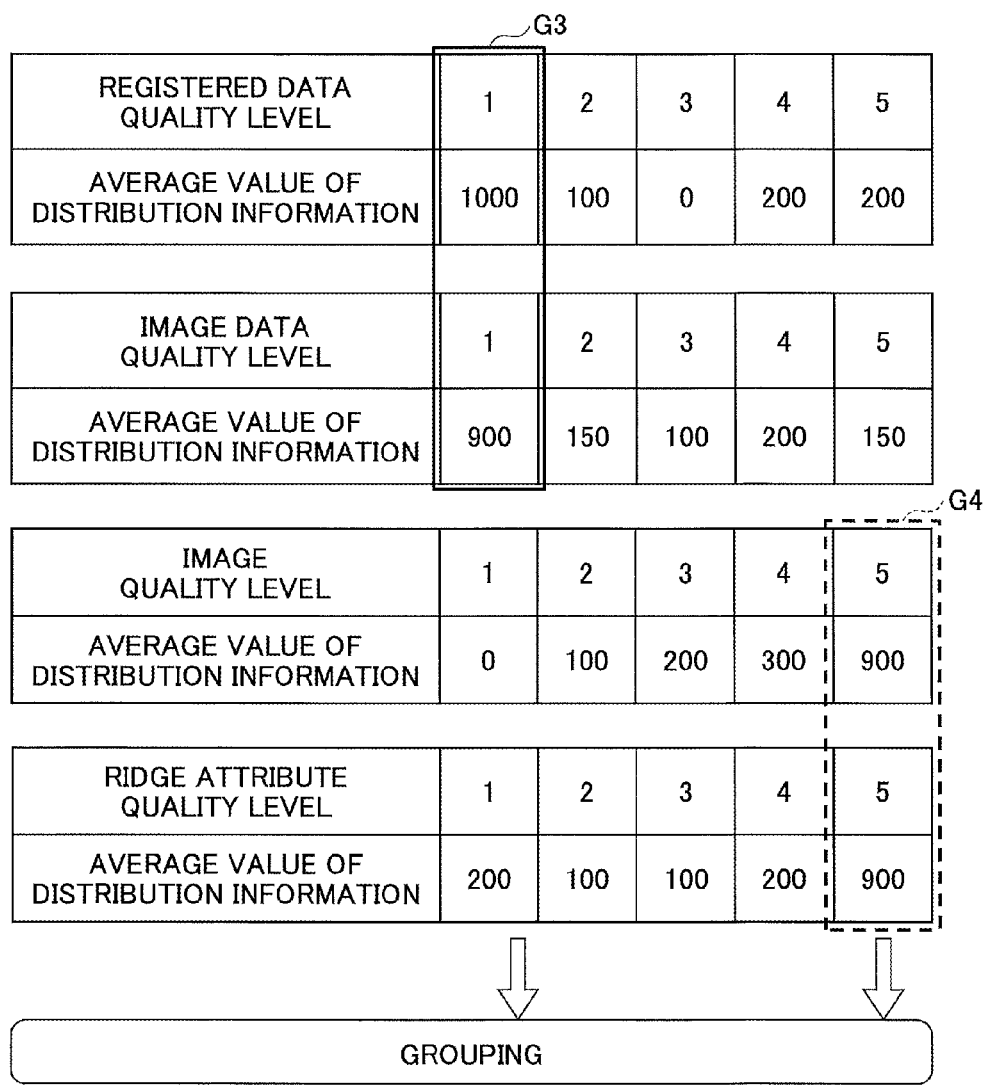
FIG. 11 is a diagram for explaining another example of the grouping of the quality levels according to the different quality types.

FIG. 11 is a diagram for explaining another example of the grouping of the quality levels according to the different quality types. FIG. 11 illustrates a part of the performance information log of the authentication server 4-*i*, for an example in which four quality types are recorded. The four quality types include the registered data quality, the image data quality, the image quality, and the ridge attribute quality. In this example of the grouping, the grouping is performed according to the continuity of the quality levels affecting the processing performance of the biometric authentication apparatus 1.

In this example, with respect to the registered data quality and the image data quality, the number of biometric data is continuously large for the quality level 1, and this quality level 1 affects the processing performance of the biometric authentication apparatus 1 to a large extent. For this reason, the quality level 1 is grouped into a single group G3 by the grouping. In addition, with respect to the image quality and the ridge attribute quality, the number of biometric data is continuously large for the quality level 5, and this quality level 5 affects the processing performance of the biometric authentication apparatus 1 to a large extent. For this reason, the quality level 5 is grouped into a single group G4 by the grouping. Furthermore, since the average number of biometric data with respect to the quality level 1 of the group G3 is larger than the average number of biometric data with respect to the quality level 5 of the group G4, the priority set for the group G3 in this example is higher than that set for the group G4.

The performance information log records the processing time, in addition to the information of the quality types and the quality levels illustrated in FIG. 10 or FIG. 11, for example. In a case in which the ID of the 1:N authentication request is "1", the matching processing time in the authentication server 4-*i* is 100 milliseconds, the number of biometric data that are matching targets of a 1:N matching in the authentication server 4-*i* is five, the quality type is the registered data quality, and the five quality levels of the registered biometric data respectively are "3", "2", "3", "1", and "5", for example, the performance information log includes the following information.

"1, 100 msec, registered data quality, 3, 2, 3, 1, 5"

Returning now to the description of FIG. 5, in step S157, the plan creating unit 54 rearranges the registered biometric data arranged in the plurality of authentication servers 4-1 through 4-N, by exchanging the registered biometric data between the authentication server having the processing time with the small average value and the authentication server having the processing time with the large average value amongst the plurality of authentication servers 4-1 through 4-N according to the priority order of the priorities added to the quality level, based on the analysis result of the quality of the biometric data analyzed by the quality analyzing unit 53, so that the number of biometric data having the quality level affecting the processing performance of the biometric authentication apparatus 1 becomes uniform amongst the plurality of authentication servers 4-1 through 4-N. The process ends after step S157.

Figure 12:
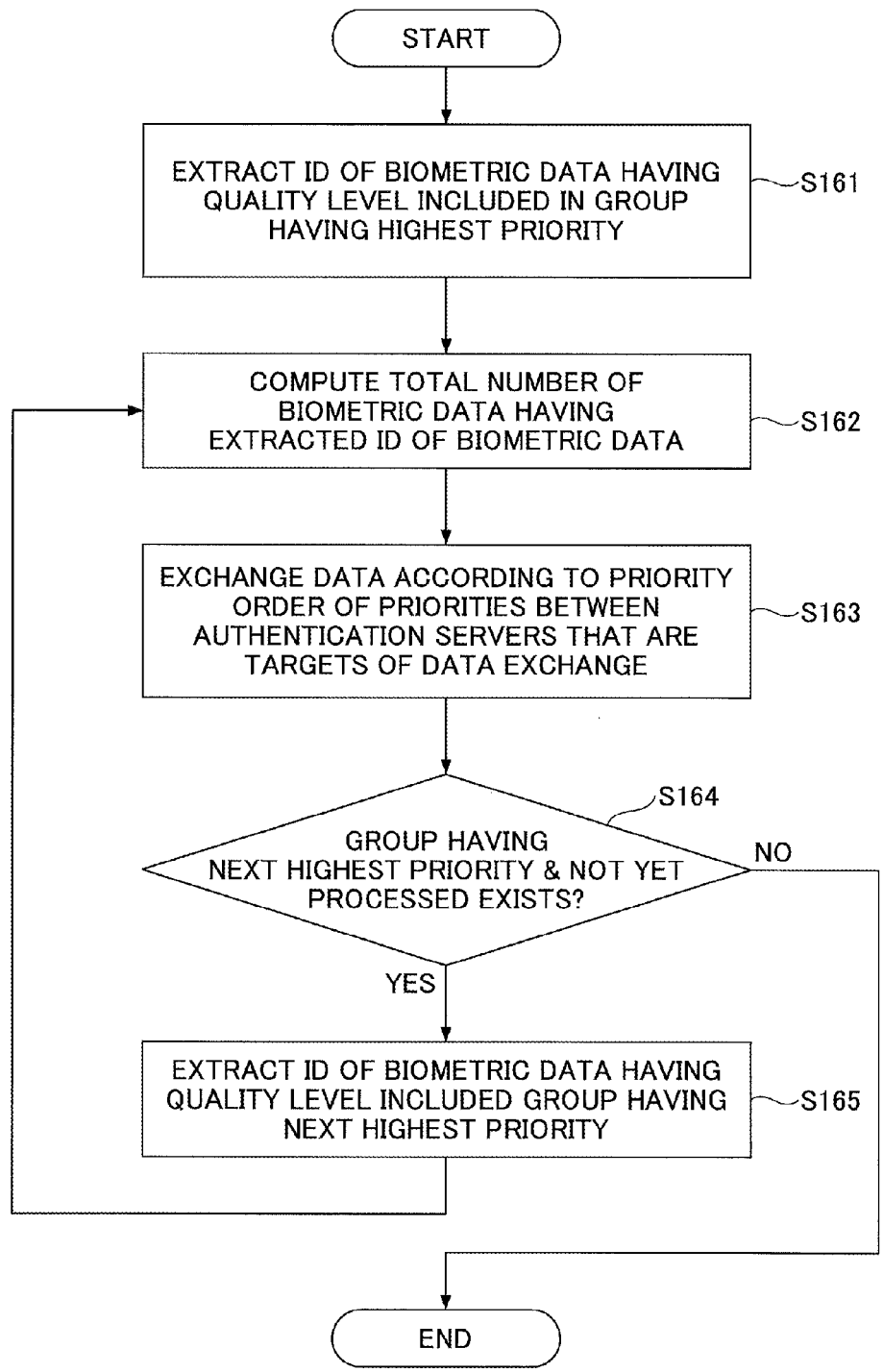
FIG. 12 is a flow chart for explaining an example of a data exchange between authentication servers.

FIG. 12 is a flow chart for explaining an example of the data exchange between the authentication servers. FIG. 12 illustrates the process of step S16 illustrated in FIG. 8 in more detail. In step S161 illustrated in FIG. 12, the plan creating unit 54 of the DB server 5 extracts from the information recorded in the DB at the time of starting the biometric authentication apparatus 1 by the process illustrated in FIG. 8, the identifier (ID) of the biometric data having the quality level included in the group having the highest priority, with respect to the authentication server having the processing time with the small average value and the high processing speed and the authentication server having the processing time with the large average value and the low processing speed that are extracted by the process illustrated in FIG. 9.

In step S162, the plan creating unit 54 computes a total number of biometric data having the identifier (ID) of the biometric data extracted in step S161. In step S163, the plan creating unit 54 divides the total number of biometric data computed in step S162 by the number of authentication servers that are targets of the data exchange, and performs the data exchange on the registered biometric data according to the priority order of the priorities between the authentication servers that are the targets of the data exchange, so that the number of biometric data having the quality levels affecting the processing performance of the biometric authentication apparatus 1 becomes uniform amongst the authentication servers that are the targets of the data exchange.

In step S164, the plan creating unit 54 judges whether a group that has the next highest priority and is not yet processed exists, and the process ends when the judgment result in step S164 is NO. On the other hand, the process advances to step S165 when the judgment result in step S164 is YES. In step S165, the plan creating unit 54 extracts from the information recorded in the DB at the time of starting the biometric authentication apparatus 1 by the process illustrated in FIG. 8, the identifier (ID) of the biometric data having the quality level included in the group having the next highest priority, with respect to the authentication server having the processing time with the small average value and the high processing speed and the authentication server having the processing time with the large average value and the low processing speed that are extracted by the process illustrated in FIG. 9. The process returns to step S162 after step S165. Hence, the data exchange is performed between the authentication servers that are the targets of the data exchange, with the priority placed on the biometric data having the quality level included in the group with the high priority.

Figure 13:
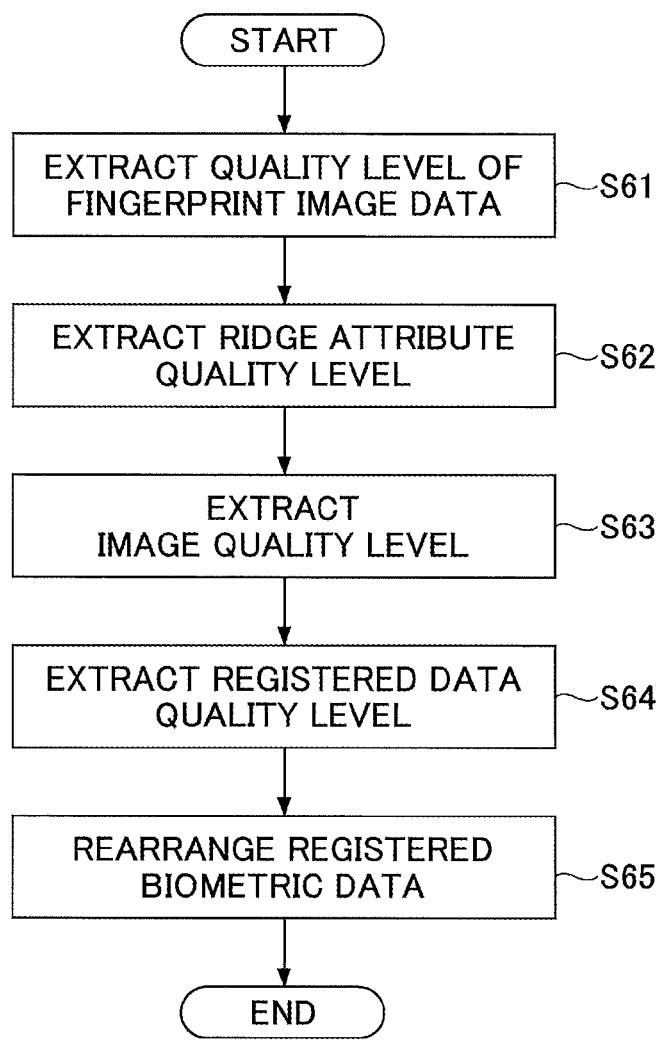
FIG. 13 is a flow chart for explaining another example of the data exchange between the authentication servers.

FIG. 13 is a flow chart for explaining another example of the data exchange between the authentication servers. FIG. 13 illustrates an example of the data exchange between the authentication servers for a case in which a plurality of quality types are defined. In this example, as described above in conjunction with the example illustrated in FIG. 11, the plurality of quality types include the four quality types which are the registered data quality, the continuity of the ridge direction, the contrast, and the resolution.

In step S61 illustrated in FIG. 13, the quality analyzing unit 53 of the DB server 5 extracts the quality level affecting the processing performance of the biometric authentication apparatus 1, more particularly, the quality level of the fingerprint image data. In step S62, the quality analyzing unit 53 extracts the quality level affecting the processing performance of the biometric authentication apparatus 1, more particularly, the quality level of the ridge attribute. In step S63, the quality analyzing unit 53 extracts the quality level affecting the processing performance of the biometric authentication apparatus 1, more particularly, the image quality level. In step S64, the quality analyzing unit 53 extracts the quality level affecting the processing performance of the biometric authentication apparatus 1, more particularly, the registered data quality level. The order in which steps S61 through S64 are executed is not limited to the order illustrated in FIG. 13.

Figure 14:
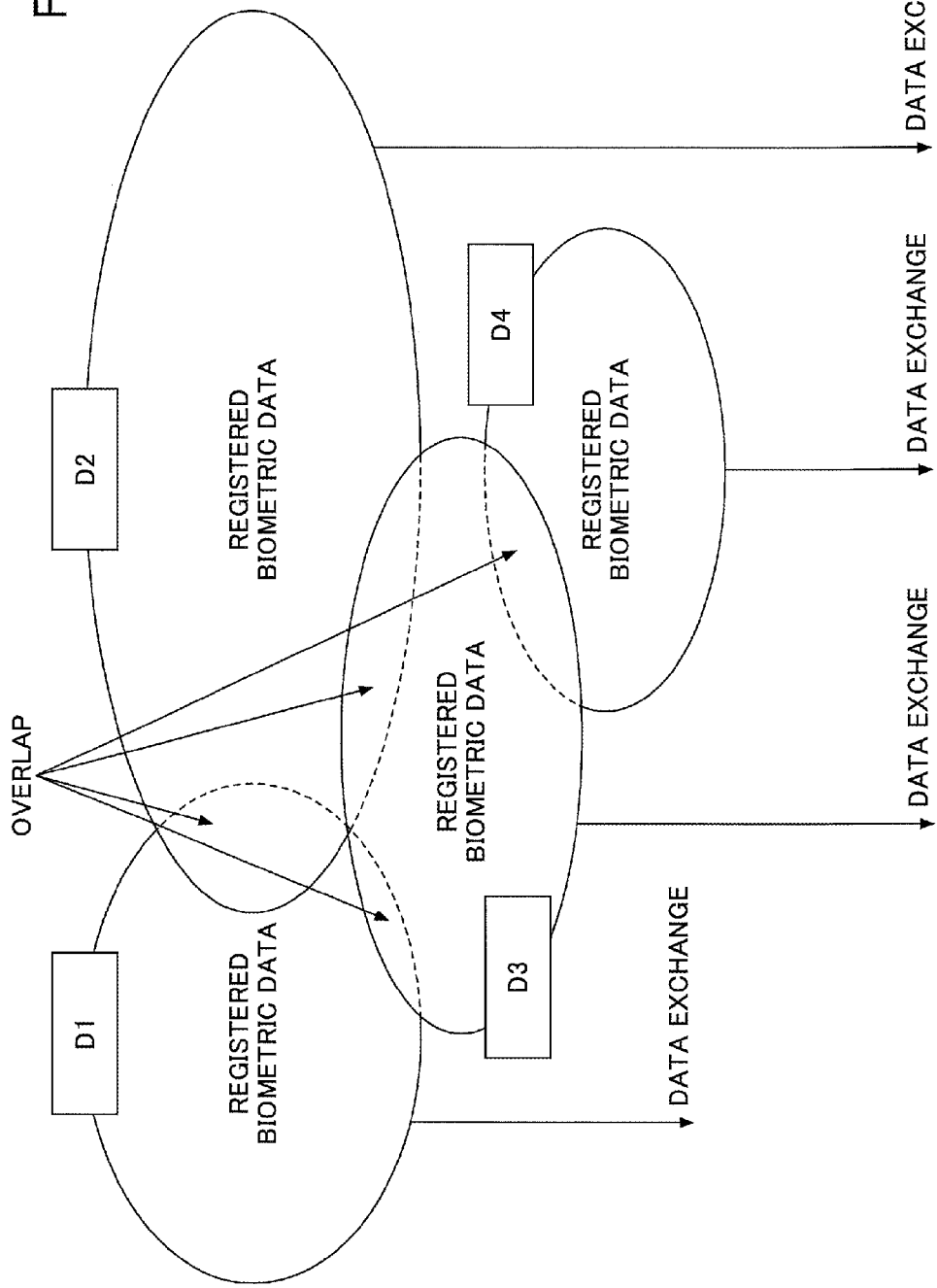
FIG. 14 is a diagram for explaining the data exchange of FIG. 13.

FIG. 14 is a diagram for explaining the data exchange of FIG. 13. In FIG. 14, D1 denotes the registered biometric data having the quality level of the fingerprint image data extracted in step S61, and D2 denotes the registered biometric data having the quality level of the ridge attribute extracted in step S62. In addition, D3 denotes the registered biometric data having the image quality level extracted in step S63, and D4 denotes the registered biometric data having the registered data quality level extracted in step S64. As represented by overlaps of oval regions indicating the registered biometric data D1 through D4 in FIG. 14, there are overlaps of the biometric data amongst the quality types. Of course, the overlaps of the biometric data amongst the quality types are not limited to those of the example illustrated in FIG. 14.

In this example, because the quality levels of the four quality types are recorded in the DB together with the registered biometric data, overlaps may occur amongst the quality levels of the plurality of quality types of the registered biometric data that are to be exchanged and affect the processing performances of the authentication servers. When performing the data exchange between the authentication servers, the data exchange is performed so that the number of registered biometric data having the same quality level of the same quality type and affecting the processing performances of the authentication server becomes uniform between the authentication servers, so that the inconsistency in the processing performances of the authentication servers is strictly reduced. On the other hand, in a case in which the quality levels of the plurality of quality types (in this example, four quality types) are used, there may exist a plurality of quality levels that affect the processing performances and are used when performing the data exchange between the authentication servers. For example, in the case of the registered biometric data having the quality levels of the ridge attribute quality and the image quality affecting the processing performances, there exist a plurality of quality levels (in this example, two quality levels) that affect the processing performances of the authentication servers. In FIG. 14, a union (or overlap) of the registered biometric data D2 and D3, for example, corresponds to a case in which at least one of the quality level of the ridge attribute quality and the image quality level affects the processing performances of the authentication servers. In this case, the registered biometric data D2 that is first extracted using the quality level of the ridge attribute quality may be exchanged between the authentication servers, and the registered biometric data D3 that is next extracted using the image quality level may be exchanged between the authentication servers by excluding the registered biometric data in a common (or overlapping) part between the registered biometric data D2 and D3, in order to improve the accuracy with which the performance of the entire biometric authentication apparatus 1 can be improved.

Returning now to the description of FIG. 13, in step S65, the plan creating unit 54 exchanges the registered biometric data according to the priority of the priorities between the authentication server having the processing time with the small average value and the authentication server having the processing time with the large average value, amongst the plurality of authentication servers 4-1 through 4-N, and rearranges the registered biometric data arranged in the plurality of authentication servers 4-1 through 4-N, so that the number of biometric data having the quality level affecting the processing performances becomes uniform. The process ends after step S65. As a result, with respect to the registered biometric data D1, for example, the biometric data, excluding the biometric data overlapping the registered biometric data D2 and D3, are exchanged between the authentication server having the processing time with the small average value and the high processing speed and the authentication server having the processing time with the large average value and the low processing speed, so that the number of biometric data having the quality level affecting the processing performances becomes uniform amongst the plurality of authentication servers 4-1 through 4-N. With respect to the registered biometric data D2, for example, the biometric data, excluding the biometric data overlapping the registered biometric data D1 and D3, are exchanged between the authentication server having the processing time with the small average value and the high processing speed and the authentication server having the processing time with the large average value and the low processing speed, so that the number of biometric data having the quality level affecting the processing performances becomes uniform amongst the plurality of authentication servers 4-1 through 4-N. With respect to the registered biometric data D3, for example, the biometric data, excluding the biometric data overlapping the registered biometric data D1, D2, and D4, are exchanged between the authentication server having the processing time with the small average value and the high processing speed and the authentication server having the processing time with the large average value and the low processing speed, so that the number of biometric data having the quality level affecting the processing performances becomes uniform amongst the plurality of authentication servers 4-1 through 4-N. With respect to the registered biometric data D4, for example, the biometric data, excluding the biometric data overlapping the registered biometric data D3, are exchanged between the authentication server having the processing time with the small average value and the high processing speed and the authentication server having the processing time with the large average value and the low processing speed, so that the number of biometric data having the quality level affecting the processing performances becomes uniform amongst the plurality of authentication servers 4-1 through 4-N. The data exchange between the authentication servers with respect to the registered biometric data D1 through D4 is performed according to the priority order of the priories described above.

As described above, in the case in which a plurality of quality types (in this example, four quality types) exist, the flow of the processes of acquiring of the biometric data and performing the 1:N matching, up to recording the performance information log, is the same as that for the case in which the number of quality types is one. However, at the time of registration to the DB server 5, the quality levels of the four quality types are acquired, the biometric data and the quality levels of the four quality types are stored in the DB within the storage unit 50 of the DB server 5, and the four quality types are similarly recorded in the performance information log when the 1:N matching is executed in each of the authentication servers 4-1 through 4-N. Next, in order to evaluate a relation of the quality type and the processing time in steps S61 through S64 illustrated in FIG. 13, the quality level affecting the processing performances is extracted with respect to each of the four quality types, according to the method of extracting the quality levels affecting the processing time described above in conjunction with FIGS. 6 and 7. Finally, in a case in which the extents to which the processing performances of the authentication servers are affected are the same amongst the quality levels of the different quality types, the quality levels are grouped into the group. In addition, priorities are added to a plurality of groups according to the extents to which the processing times are affected, and the registered biometric data are exchanged in a range of the groups in the order of the priorities starting from the highest priority.

Figure 15:
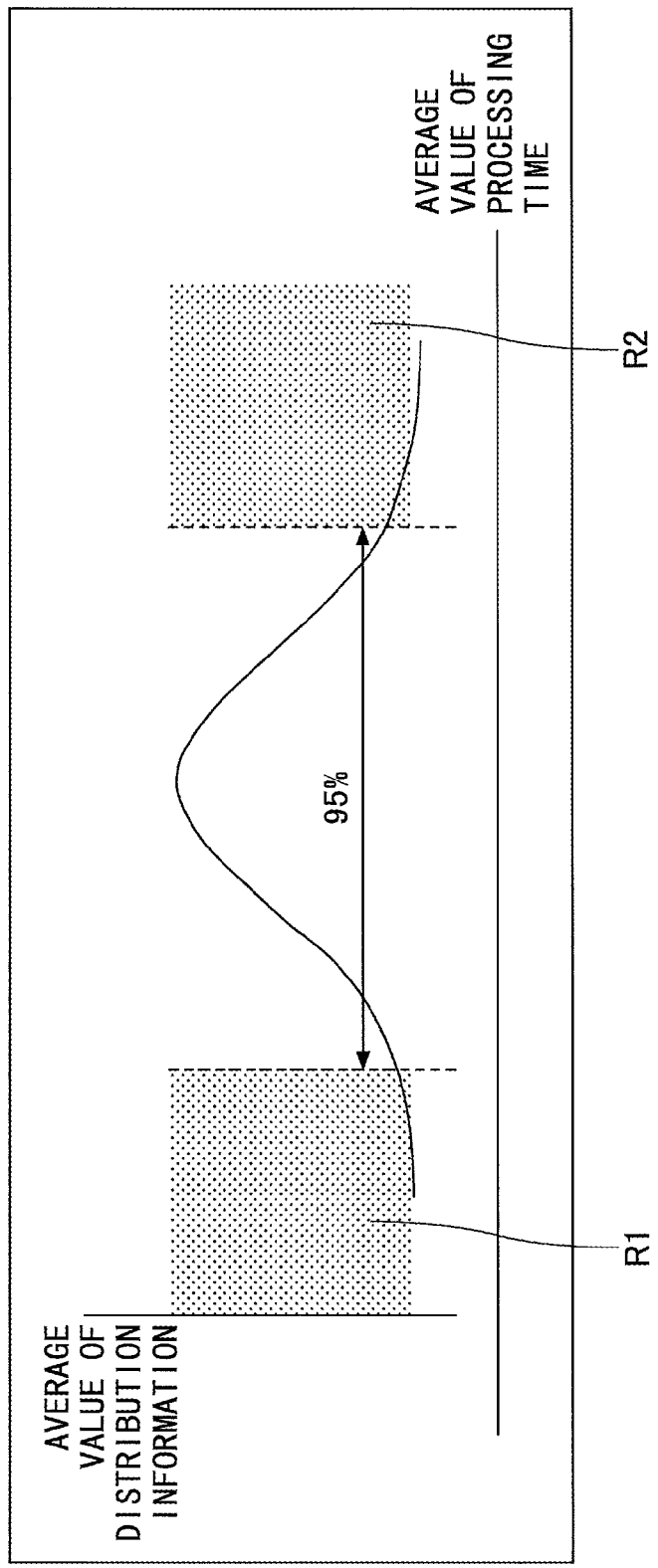
FIG. 15 is a diagram for explaining an example of an extraction of the authentication servers that perform the data exchange.

FIG. 15 is a diagram for explaining an example of the extraction of the authentication servers that perform the data exchange. In the example illustrated in FIG. 15, in order to extract the authentication servers having the processing time with the small average value (for example, 100 milliseconds or less) and the high processing speed and the authentication servers having the processing time with the large average value (for example, 1 second or greater) and the low processing speed, the the authentication servers included in ranges R1 and R2 are extracted. The ranges R1 and R2 are not included in 95% of the normal distribution, for example, that is, not included in a range computed from $Va \pm \sigma \times 2$, where Va denotes the average value of the processing time of the entire biometric authentication apparatus 1, and 6 denotes a standard deviation. In this example, the authentication server 4-1 is the authentication server having the processing time with the small average value and the high processing speed, and the authentication server 4-2 is the authentication server having the processing time with the large average value and the low processing speed.

Figure 16:
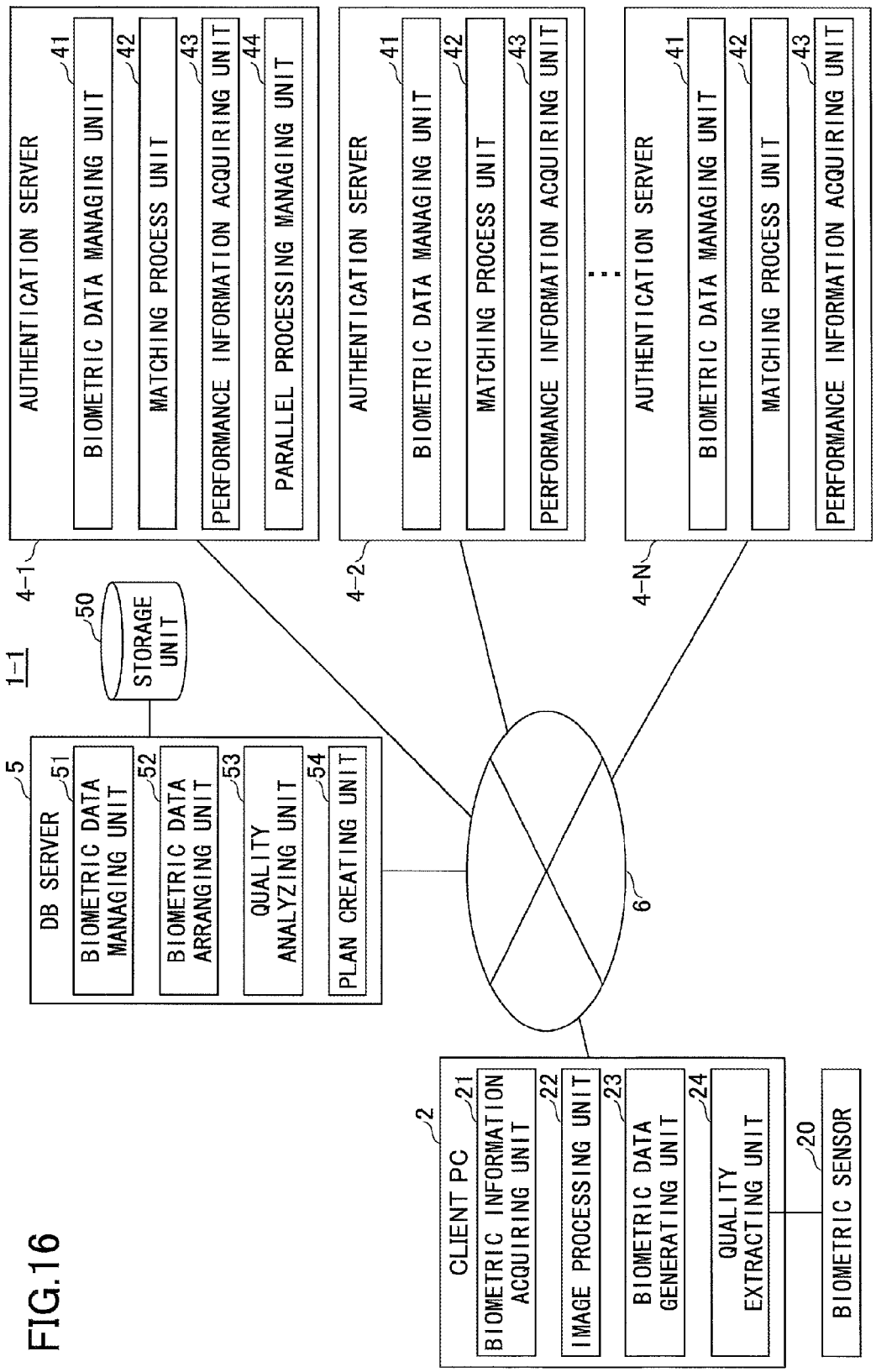
FIG. 16 is a block diagram illustrating an example of the configuration of the biometric authentication apparatus in a modification.

FIG. 16 is a block diagram illustrating an example of the configuration of the biometric authentication apparatus in a modification. In FIG. 16, those parts that are the same as those corresponding parts in FIG. 1 are designated by the same reference numerals, and a description thereof will be omitted. In this modification, a biometric authentication apparatus 1-1 has a configuration that does not include the parallel processing management server 3.

In this modification, amongst the plurality of authentication servers 4-1 through 4-N, one authentication server 4-1 functions as a master with respect to the other authentication servers 4-2 through 2-N, and also as the parallel processing management server 3. For this reason, the authentication server 4-1 includes a parallel processing managing unit 44 having functions similar to the parallel processing managing unit 31. This parallel processing managing unit 44 distributes the process to the plurality of authentication servers 4-1 through 4-N, including the authentication server 4-1 to which the parallel processing managing unit 44 belongs, in response to the 1:N authentication request from the client PC 2.

Next, a description will be given of a general operation of the biometric authentication apparatus 1-1, by referring to FIG. 17. FIG. 17 is a flow chart for explaining an example of the general operation of the biometric authentication apparatus in this modification.

In FIG. 17, the client PC 2 executes step S201 at the time of registering the biometric data. More particularly, in the client PC 2, the biometric information acquiring unit 21 acquires the biometric information (for example, biometric image data) of the user detected by the biometric sensor 20, and the image processing unit 22 performs an image processing, such as noise reduction, binarization, thinning, or the like, with respect to the acquired biometric information. In addition, the biometric data generating unit 23 generates biometric data to be registered in the DB of the DB server 5, based on the biometric information that is subjected to the image processing in the image processing unit 22. Further, the quality extracting unit 24 extracts quality information (for example, a quality level) indicating the quality of the biometric data, from the biometric information of the user detected by the biometric sensor 20 and the biometric data generated by the biometric data generating unit 23.

The DB server 5 executes step S202 at the time of starting or restarting the biometric authentication apparatus 1. More particularly, in the DB server 5, the biometric data arranging unit 52 arranges the biometric data registered in the DB in each of the authentication servers 4-1 through 4-N. The biometric data arranged in each of the authentication servers 4-1 through 4-N are stored in the biometric data managing unit 41 or in a storage unit (not illustrated) that is managed by the biometric data managing unit 41. In addition, the quality analyzing unit 53 records, in the DB, quality distribution information including a number of biometric data, identifiers (IDs) of the biometric data, the quality level of the corresponding biometric data, or the like for each quality level of the biometric data arranged in each of the authentication servers 4-1 through 4-N. The biometric data arranging unit 52 may, at the time of starting or restarting the biometric authentication apparatus 1, arrange the biometric data registered in the DB in each of the authentication servers 4-1 through 4-N, based on an analysis result of the quality of the biometric data analyzed by the quality analyzing unit 53.

The parallel processing managing unit 44 of the authentication server 4-1 which functions as the master executes step S203 when the parallel processing managing unit 44 receives a 1:N authentication request from the client PC 2. More particularly, in the authentication server 4-1, the parallel processing managing unit 44 distributes the processes to the plurality of authentication servers 4-1 through 4-N in response to the 1:N authentication request.

Each of the authentication servers 4-1 through 4-N executes step S204. More particularly, in each of the authentication servers 4-1 through 4-N, the matching process unit 42 records a processing time for the case in which the 1:N authentication is performed, and the quality information of the registered biometric data managed by the biometric data managing unit 41, matched with the biometric data sent from the client PC 2 and acquired by the performance information acquiring unit 43, in the performance information log within the biometric data managing unit 41. The performance information log is stored in the performance information acquiring unit 43 or in the storage unit managed by the performance information acquiring unit 43.

The authentication server 4-1 which functions as the master executes step S205. More particularly, in the authentication server 4-1, the parallel processing managing unit 44 periodically aggregates and sends to the DB server 5 the performance information logs from each of the authentication servers 4-1 through 4-N.

The DB server 5 executes step S206. More particularly, in the DB server 5, the quality analyzing unit 53 judges whether the time is the analyzing time of the performance information log sent from the authentication server 4-1 and stored in the DB, and the process returns to step S202 when the judgment result in step S206 is NO. On the other hand, the process advances to step S207 when the judgment result in step S206 is YES.

The DB server 5 executes step S207. More particularly, in the DB server 5, the quality analyzing unit 53 makes a reference to the performance information log sent from each of the authentication servers 4-1 through 4-N, and extracts and stores in the DB the quality levels that affect the processing performance of the biometric authentication apparatus 1, amongst the authentication servers having the processing time with a small average value (that is, a high processing speed) and the authentication servers having the processing time with a large average value (that is, a low processing speed).

The DB server 5 executes step S208 when the quality levels of different quality types exist. More particularly, in the DB server 5, the quality analyzing unit 53 adds a priority to the quality levels that affect the processing performance of the biometric authentication apparatus 1 approximately to the same extent, amongst the quality levels of the different quality types within the performance information log stored in the DB, based on the quality levels judged as affecting the processing performance, and groups the quality levels added with the same priority into the same group. The priority represents a priority order with which the registered biometric data are to be exchanged amongst the plurality of authentication servers 4-1 through 4-N, and the higher the priority the more the processing performance of the biometric authentication apparatus 1 is affected.

The DB server 5 executes step S209. More particularly, in the DB server 5, the plan creating unit 54 rearranges the biometric data registered in the DB in each of the authentication servers 4-1 through 4-N, based on the analysis result of the quality of the biometric data analyzed by the quality analyzing unit 53, including the grouping, and the process ends. In other words, the plan creating unit 54 rearranges the registered biometric data by exchanging the registered biometric data between the authentication server having the processing time with the large average value and the authentication server having the processing time with the small average value, amongst the plurality of authentication servers 4-1 through 4-N, so that the number of biometric data having the quality levels affecting the processing performance of the biometric authentication apparatus 1 becomes uniform amongst the plurality of authentication servers 4-1 through 4-N.

According to the embodiment and the modification described above, the plurality of processing apparatus that perform the 1:N authentication by the parallel processing exchange data based on the relationship of the plurality of quality levels and the processing performances (processing times), so that the authentication processing time can be levelled (or smoothened) amongst the plurality of processing apparatuses. For this reason, the processing performance of the biometric authentication apparatus can be improved. In addition, by adding the priority to the quality level of the registered biometric data when exchanging the data amongst the plurality of processing apparatuses and grouping the registered biometric data according to the priority, the data exchange can be started from the registered biometric data having the quality level that affects the processing time to a large extent. Accordingly, the effect of reducing the inconsistency in the processing times amongst the processing apparatuses can be improved, and the data exchange amongst the processing apparatuses can be performed with ease within the range of the quality level.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication apparatus comprising:
   a plurality of processors that are allocated with biometric data to be matched to an input biometric data by a parallel processing;
   a first management processor configured to distribute a 1:N matching process to the plurality of processors and return an authentication result to a request source of the 1:N matching process by integrating results of the parallel processing of the 1:N matching process performed by the plurality of processors, where N is a natural number greater than or equal to two;
   a storage configured to store a distribution of the biometric data amongst the plurality of processors for each of a plurality of quality levels that are categorized into a plurality of duality types and indicates a quality of the biometric data for one of the plurality of quality types, and an authentication processing time required by each of the plurality of processors to perform an authentication process on the input biometric data for each of the plurality of quality levels of the one of the plurality of quality types; and
   a second management processor configured to perform a process including
      extracting a first processor and a second processor from the plurality of processors based on authentication processing times of the plurality of processors stored in the storage for each of the plurality of quality levels of the one of the plurality of quality types,
      identifying a quality level of a certain quality type for which a difference of the distributions of the biometric data between the first and second processors is greater than or equal to a threshold value, and
      exchanging the biometric data having the identified quality level of the certain quality type between the first and second processors, to uniformly distribute the biometric data having the identified quality level of the certain quality type between the first and second processors.

2. The biometric authentication apparatus as claimed in claim 1, wherein the second management processor performs the process further including
adding a priority to quality levels that affect a processing performance of the biometric authentication apparatus to a certain extent, amongst the plurality of quality levels of the plurality of quality types,
grouping the quality levels added with a certain priority into a single group, and
determining a priority order with which the biometric data of each of a plurality of groups are to be exchanged amongst the plurality of processors according to the priority added to the quality levels of each of the plurality of groups.

3. The biometric authentication apparatus as claimed in claim 2, wherein the grouping groups the quality levels affecting the processing performance according to a range of extents to which the quality levels affect the processing performance.

4. The biometric authentication apparatus as claimed in claim 1, wherein the second management processor performs the process further including
determining an allocation of the biometric data to the plurality of processors by evaluating a relation between the plurality of quality levels of the plurality of quality types and the authentication processing times of the plurality of processors for the plurality of quality levels of the plurality of quality types.

5. The biometric authentication apparatus as claimed in claim 1, wherein the exchanging exchanges the biometric data having a quality level of a quality type that affects a processing performance of the biometric authentication apparatus to extents within a range, between the first and second processors, to uniformly distribute the biometric data having the quality level of the quality type that affects the processing performance amongst the plurality of processors.

6. The biometric authentication apparatus as claimed in claim 1, wherein the first management processor is formed by one of the plurality of processors.

7. A biometric authentication method comprising:
allocating to a plurality of processors, by a first management processor, biometric data to be matched to an input biometric data by a parallel processing of the plurality of processors;
distributing, by a second management processor, a 1:N matching process to the plurality of processors and returning an authentication result to a request source of the 1:N matching process by integrating results of the parallel processing of the 1:N matching process performed by the plurality of processors, where N is a natural number greater than or equal to two;
storing in a storage by the first management processor, a distribution of the biometric data amongst the plurality of processors for each of a plurality of quality levels that are categorized into a plurality of quality types and indicates a quality of the biometric data for one of a plurality of quality types, and an authentication processing time required by each of the plurality of processors to perform an authentication process on the input biometric data for each of the plurality of quality levels of the one of the plurality of quality types; and
exchanging, by the first management processor, the biometric data having an identified quality level of a certain quality type between a first processor and a second processor extracted from the plurality of processors based on authentication processing times of the plurality of processors stored in the storage for each of the plurality of quality levels of the one of the plurality of quality types, by identifying the quality level of the certain quality type for which a difference of the distributions of the biometric data between the first and second processors is greater than or equal to a threshold value, to uniformly distribute the biometric data having the identified quality level of the certain quality type between the first and second processors.

8. The biometric authentication method as claimed in claim 7, wherein the exchanging includes
adding, by the first management processor, a priority to quality levels that affect a processing performance of a biometric authentication apparatus that includes the first management processor, the second management processor, and the plurality of processors to a certain extent, amongst the plurality of quality levels of the plurality of quality types,
grouping, by the first management processor, the quality levels added with a certain priority into a single group, and
determining, by the first management processor, a priority order with which the biometric data of each of a plurality of groups are to be exchanged amongst the plurality of processors according to the priority added to the quality levels of each of the plurality of groups.

9. The biometric authentication method as claimed in claim 8, wherein the grouping, by the first management processor, groups the quality levels affecting the processing performance according to a range of extents to which the quality levels affect the processing performance.

10. The biometric authentication method as claimed in claim 7, wherein the exchanging includes
determining, by the first management processor, an allocation of the biometric data to the plurality of processors by evaluating a relation between the plurality of quality levels of the plurality of quality types and the authentication processing times of the plurality of processors of the plurality of quality levels of the plurality of quality types.

11. The biometric authentication method as claimed in claim 7, wherein the exchanging exchanges, by the first management processor, the biometric data having a quality level of a quality type that affects a processing performance of a biometric authentication apparatus that includes the first management processor and the plurality of processor to extents within a range, between the first and second processors, to uniformly distribute the biometric data having the quality level of the Quality type that affects the processing performance amongst the plurality of processors.

12. The biometric authentication method as claimed in claim 7, wherein the second management processor is formed by one of the plurality of processors.

13. A non-transitory computer-readable storage medium having stored therein a program which, when executed by a computer, causes the computer to perform a process comprising:
allocating, to a plurality of processors, biometric data to be matched to an input biometric data by a parallel processing of the plurality of processors;
distributing a 1:N matching process to the plurality of processors and returning an authentication result to a request source of the 1:N matching process by integrating results of the parallel processing of the 1:N matching process performed by the plurality of processors, where N is a natural number greater than or equal to two;

storing, in a storage, a distribution of the biometric data amongst the plurality of processors for each of a plurality of quality levels that are categorized into a plurality of quality types and indicates a quality of the biometric data for one of the plurality of quality types, and an authentication processing time required by each of the plurality of processors to perform an authentication process on the input biometric data for each of the plurality of quality levels of the one of the plurality of quality types; and exchanging the biometric data having an identified quality level between a first processor and a second processor extracted from the plurality of processors based on authentication processing times of the plurality of processors stored in the storage for each of the plurality of quality levels of a certain quality type, by identifying the quality level for which a difference of the distributions of the biometric data between the first and second processors is greater than or equal to a threshold value, to uniformly distribute the biometric data having the identified Quality level of the certain Quality type between the first and second processors.

14. The non-transitory computer-readable storage medium as claimed in claim 13, wherein the exchanging includes adding a priority to quality levels that affect a processing performance of a biometric authentication apparatus that includes the computer and the plurality of processors to a certain extent, amongst the plurality of quality levels of the plurality of quality types;

grouping the quality levels added with a certain priority into a single group; and determining a priority order with which the biometric data of each of a plurality of groups are to be exchanged amongst the plurality of processors according to the priority added to the quality levels of each of the plurality of groups.

15. The non-transitory computer-readable storage medium as claimed in claim 14, wherein the grouping groups the quality levels affecting the processing performance according to a range of extents to which the quality levels affect the processing performance.

16. The non-transitory computer-readable storage medium as claimed in claim 13, wherein the exchanging includes determining an allocation of the biometric data to the plurality of processors by evaluating a relation between the plurality of quality levels of the plurality of quality types and the authentication processing times of the plurality of processors for each of the plurality of quality levels of the one of the plurality of quality types.

17. The non-transitory computer-readable storage medium as claimed in claim 13, wherein the exchanging exchanges the biometric data having a quality level of a quality type that affects a processing performance of a biometric authentication apparatus that includes the computer and the plurality of processors to extents within a range, between the first and second processors, to uniformly distribute the biometric data having the quality level of the quality type that affects the processing performance amongst the plurality of processors.

* * * * *